(12) United States Patent
Chawla et al.

(10) Patent No.: US 12,265,549 B2
(45) Date of Patent: *Apr. 1, 2025

(54) SYSTEM AND METHOD FOR SAAS/PAAS RESOURCE USAGE AND ALLOCATION IN AN ANALYTIC APPLICATIONS ENVIRONMENT

(71) Applicant: ORACLE INTERNATIONAL CORPORATION, Redwood Shores, CA (US)

(72) Inventors: Naren Chawla, Redwood City, CA (US); Ananth Venkata, San Ramon, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/883,471

(22) Filed: Aug. 8, 2022

(65) Prior Publication Data

US 2022/0377022 A1 Nov. 24, 2022

Related U.S. Application Data

(63) Continuation of application No. 16/862,440, filed on Apr. 29, 2020, now Pat. No. 11,436,259.
(Continued)

(51) Int. Cl.
G06F 17/00 (2019.01)
G06F 16/2457 (2019.01)
(Continued)

(52) U.S. Cl.
CPC ...... *G06F 16/283* (2019.01); *G06F 16/24575* (2019.01); *G06F 16/2458* (2019.01);
(Continued)

(58) Field of Classification Search
CPC ............. G06F 16/283; G06F 16/24575; G06F 16/2458; G06F 16/248; G06F 16/254;
(Continued)

(56) References Cited

U.S. PATENT DOCUMENTS 7,058,615 B2    6/2006  Yao
8,799,209 B2    8/2014  Bakalash
(Continued)

FOREIGN PATENT DOCUMENTS

| JP | 2003529119 | 9/2003 |
| JP | 2009146350 | 7/2009 |
| WO | 2014123565 | 8/2014 |

OTHER PUBLICATIONS

Bowen Zhou and Rajkumar Buyya. 2018. Augmentation Techniques for Mobile Cloud Computing: A Taxonomy, Survey, and Future Directions. ACM Comput. Surv. 51, 1, Article 13 (Jan. 2019), 38 pages. <https://doi.org/10.1145/3152397> (Year: 2019).*
(Continued)

Primary Examiner — Greta L Robinson
(74) Attorney, Agent, or Firm — TUCKER ELLIS LLP

(57) ABSTRACT

Systems and method for SaaS/PaaS resource usage and allocation in an analytic applications environment. An exemplary method can provide an analytic applications environment, a control plane comprising a server, the control plane further comprises a provisioning component and a console interface, a data warehouse, and a monitoring agent. The method can provision an instance of the data warehouse in the context of a tenant, the provisioned instance of the data warehouse having an initial size. Upon the provisioning the instance of the data warehouse, the method can add adding an entry to a metrics repository of the monitoring agent, the added entry indicative of the initial size of the provisioned instance of the data warehouse, the added entry being tagged, the tag being indicative of the tenant. The
(Continued)

method can monitor, by the monitoring agent, an amount of data stored at the provisioned instance of the data warehouse.

20 Claims, 20 Drawing Sheets

Related U.S. Application Data

(60) Provisional application No. 62/841,058, filed on Apr. 30, 2019.

(51) Int. Cl.
  *G06F 16/2458* (2019.01)
  *G06F 16/248* (2019.01)
  *G06F 16/28* (2019.01)
  *H04L 12/14* (2006.01)
  *H04L 47/70* (2022.01)
  *H04L 47/762* (2022.01)
  *H04L 47/80* (2022.01)

(52) U.S. Cl.
  CPC ........ *G06F 16/248* (2019.01); *H04L 12/1403* (2013.01); *H04L 47/762* (2013.01); *H04L 47/808* (2013.01); *H04L 47/822* (2013.01)

(58) Field of Classification Search
  CPC ................. G06F 16/256; G06F 9/5072; G06F 11/3476; G06F 11/3495; H04L 47/762; H04L 47/808; H04L 47/822; H04L 12/1403; G06Q 30/0283
  See application file for complete search history.

(56) References Cited

U.S. PATENT DOCUMENTS

| | | | |
|---|---|---|---|
| 9,355,145 | B2 | 5/2016 | George |
| 9,442,993 | B2 | 9/2016 | Tung |
| 9,619,535 | B1 | 4/2017 | Kapoor |
| 9,961,011 | B2 | 5/2018 | Mordani |
| 10,110,390 | B1 | 10/2018 | Nguyen |
| 10,120,918 | B2* | 11/2018 | Dhayapule ............ H04L 47/125 |
| 10,324,932 | B2 | 6/2019 | Gordon |
| 10,572,679 | B2 | 2/2020 | Frank |
| 10,664,321 | B2 | 5/2020 | Reddipalli |
| 10,742,568 | B2 | 8/2020 | Mordani |
| 10,762,086 | B2 | 9/2020 | Wu |
| 10,970,303 | B1 | 4/2021 | Denton |
| 10,983,895 | B2* | 4/2021 | Babu ................... G06F 11/3636 |
| 10,997,129 | B1 | 5/2021 | Nanda |
| 11,106,508 | B2 | 8/2021 | Calhoun |
| 11,190,599 | B2* | 11/2021 | Greenstein .......... H04L 67/1097 |
| 11,194,795 | B2 | 12/2021 | Muralidhar |
| 11,343,200 | B2 | 5/2022 | Mordani |
| 11,436,259 | B2* | 9/2022 | Chawla ............. G06F 16/24575 |
| 11,640,406 | B2 | 5/2023 | Reinshagen |
| 11,683,274 | B2 | 6/2023 | Mordani |
| 2004/0215584 | A1 | 10/2004 | Yao |
| 2008/0162509 | A1 | 7/2008 | Becker |
| 2009/0319544 | A1 | 12/2009 | Griffin |
| 2012/0089564 | A1 | 4/2012 | Bakalash |
| 2012/0191642 | A1 | 7/2012 | George |
| 2012/0310875 | A1 | 12/2012 | Prahlad |
| 2014/0059217 | A1* | 2/2014 | Pizurica ................. H04L 43/08 709/224 |
| 2014/0229511 | A1 | 8/2014 | Tung |
| 2015/0207758 | A1 | 7/2015 | Mordani |
| 2016/0224803 | A1 | 8/2016 | Frank |
| 2016/0328566 | A1 | 11/2016 | Nellamakkada |
| 2017/0249361 | A1 | 8/2017 | Gordon |
| 2018/0052898 | A1* | 2/2018 | Allan .................... G06F 16/435 |
| 2018/0060400 | A1* | 3/2018 | Wu .......................... G06F 9/50 |
| 2019/0042322 | A1* | 2/2019 | Calhoun ............. H04L 41/0896 |
| 2019/0114211 | A1 | 4/2019 | Reddipalli |
| 2020/0334240 | A1 | 10/2020 | Muralidhar |
| 2021/0342341 | A1 | 11/2021 | Fujimaki |

OTHER PUBLICATIONS

Christian Janiesch et al., Business activity management for service networks in cloud environments. In Proceedings of the 6th Workshop on Middleware for Service Oriented Computing. Association for Computing Machinery, Article 2, 1-6. <https://doi.org/10.1145/2093185.2093187>, Dec. 2011.*

Schneider, Erich et al., "SAP Hana® Platform—Technical Overview: Driving Innovations in IT and in Business with In-Memory Computing Technology", Feb. 21, 2012, 20 pages.

Domingues, Marcos Aurelio, "An Independent Platform for the Monitoring, Analysis and Adaptation of Web Sites", Proceedings of the 2008 SCM conference on Recommender systems, Oct. 2008, pp. 299-302.

United States Patent and Trademark Office, Office Communication dated Aug. 23, 2023 for U.S. Appl. No. 16/920,574, 16 pages.

Ramesh, S. M. and Gomathy, B. "Review on Scheduling Algorithms for Data Warehousing" International Journal of Science and Research (IJSR), vol. 3 Issue 9, Sep. 2014, 6 pages.

United States Patent and Trademark Office, Notice of Allowance and Fee(s) due dated Jul. 26, 2023 for U.S. Appl. No. 16/851,869, 9 pages.

Intellectual Property India, Examination report under sections 12 & 13 of the Patents Act, 1970 and the Patents Rules, 2003 dated Apr. 2, 2023 for Indian Patent Application No. 202147016801, 7 pages.

United States Patent and Trademark Office, Office Communication dated Nov. 7, 2023 for U.S. Appl. No. 18/137,306, 20 pages.

United States Patent and Trademark Office, Office Communication dated Nov. 28, 2023 for U.S. Appl. No. 17/076,164, 30 pages.

Rick Greenwald et al., "Oracle Essentials: Oracle Database 12c" In: "Oracle Essentials: Oracle Database 12c", Sep. 21, 2013: Fifth Edition, 396 pages.

European Patent Office, Communication pursuant to Article 94(3) EPC dated Jun. 17, 2024 for European Patent Application No. 20730786.9, 9 pages.

Japan Patent Office, Notice of Reasons for Refusal dated Jun. 13, 2024 for Japanese Patent Application No. 2021-551582, 12 pages.

Japan Patent Office, Notice of Reasons for Refusal dated Jun. 12, 2024 for Japanese Patent Application No. 2021-551572, 6 pages.

United States Patent and Trademark Office, Office Communication dated Jul. 1, 2024 for U.S. Appl. No. 17/076,164, 18 pages.

* cited by examiner

SYSTEM AND METHOD FOR SAAS/PAAS RESOURCE USAGE AND ALLOCATION IN AN ANALYTIC APPLICATIONS ENVIRONMENT

CLAIM OF PRIORITY

This application is a continuation of and claims the benefit of priority to U.S. Patent Application titled "SYSTEM AND METHOD FOR SAAS/PAAS RESOURCE USAGE AND ALLOCATION IN AN ANALYTIC APPLICATIONS ENVIRONMENT", application Ser. No. 16/862,440, filed Apr. 29, 2020; which application claims the benefit of priority to U.S. Provisional Patent Application titled "SYSTEM AND METHOD FOR PROVIDING HYBRID BILLING IN AN ANALYTICS APPLICATION ENVIRONMENT", Application No. 62/841,058, filed Apr. 30, 2019; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to computer data analytics, and business intelligence, and are particularly related to systems and methods for providing an application analytics environment that enables the development of software analytic applications.

BACKGROUND

Generally described, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example, an Oracle Fusion Applications environment or other type of enterprise software application or data environment; or within the context of a software-as-a-service (SaaS) or cloud environment, such as, for example, an Oracle Analytics Cloud or Oracle Cloud Infrastructure environment, or other type of cloud environment.

Traditional SaaS (Software as a Service)/PaaS (Platform as a Service) billing systems generally charge customers/tenants for use of the SaaS/PaaS by the number of seats (e.g., users allowed to access the SaaS at any given moment) selected by the customer/tenant during the initial purchase/license agreement for the SaaS/PaaS. While this model traditionally works well for SaaS/PaaS, issues may arise when a customer/tenant requires or needs more resources above those already purchased. In such situations, for example, the only mechanism available to the customer/tenant would be to, for example, purchase a number of additional seats for the SaaS/PaaS.

SUMMARY

In accordance with an embodiment, an analytic applications environment enables data analytics within the context of an organization's enterprise software application or data environment, or a software-as-a-service or other type of cloud environment; and supports the development of computer-executable software analytic applications.

In accordance with an embodiment, a data pipeline or process, such as, for example, an extract, transform, load process, can operate in accordance with an analytic applications schema adapted to address particular analytics use cases or best practices, to receive data from a customer's (tenant's) enterprise software application or data environment, for loading into a data warehouse instance.

In accordance with an embodiment, each customer (tenant) can additionally be associated with a customer tenancy and a customer schema. The data pipeline or process populates their data warehouse instance and database tables with data as received from their enterprise software application or data environment, as defined by a combination of the analytic applications schema, and their customer schema.

In accordance with an embodiment, access to the analytic applications environment can be provided, e.g., as a Software-as-a-Service (SaaS) application or offering, that can be made accessible to customers of a cloud environment (e.g., an Oracle Cloud Infrastructure, OCI, or other cloud environment), or provided as a cloud service (e.g., an Oracle Analytics Cloud service, OAC, Oracle Fusion Analytics service, or other cloud service).

In accordance with an embodiment, the provisioning offered through cloud environments such as, for example, OCI, which enables support for features such as pipeline and data backup, restoration, and patching, can be integrated with other SaaS or Platform-as-a-Service (PaaS) components, including, for example, billing components that provide support for customer-specific limits on data processing, and hybrid (e.g., based on a combination of SaaS/PaaS) billing.

Described herein are systems and method for SaaS/PaaS resource usage and allocation in an analytic applications environment. An exemplary method can provide an application analytics environment, a control plane comprising a server, the control plane further comprises a provisioning component and a console interface, a data warehouse, and a monitoring agent. The method can provision an instance of the data warehouse in the context of a tenant, the provisioned instance of the data warehouse having an initial size. Upon the provisioning the instance of the data warehouse, the method can add adding an entry to a metrics repository of the monitoring agent, the added entry indicative of the initial size of the provisioned instance of the data warehouse, the added entry being tagged, the tag being indicative of the tenant. The method can monitor, by the monitoring agent, an amount of data stored at the provisioned instance of the data warehouse.

DETAILED DESCRIPTION

Figure 1:
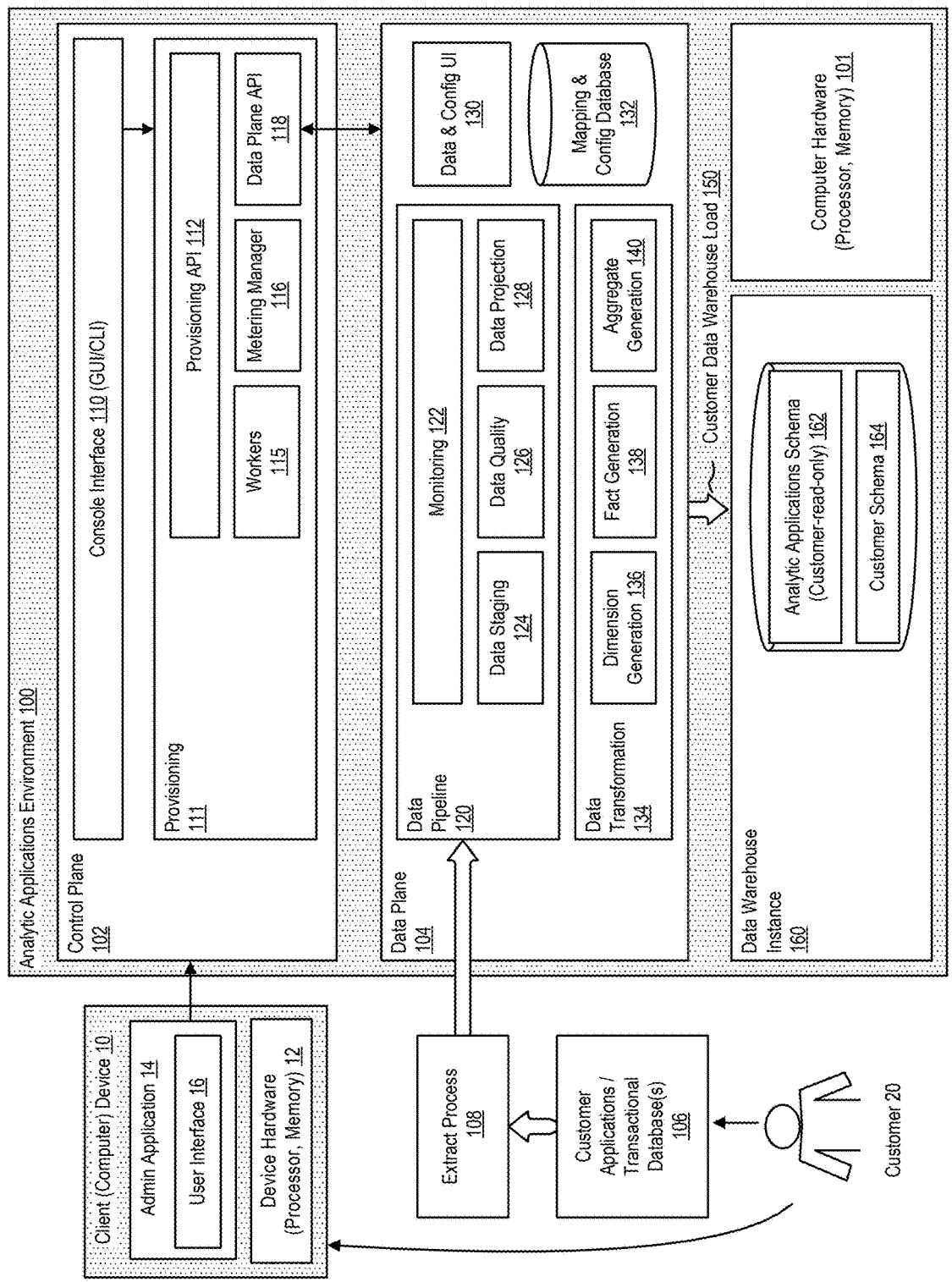
FIG. 1 illustrates a system for providing an analytic applications environment, in accordance with an embodiment.

As described above, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example, an Oracle Fusion Applications environment or other type of enterprise software application or data environment; or within the context of a software-as-a-service (SaaS) or cloud environment, such as, for example, an Oracle Analytics Cloud or Oracle Cloud Infrastructure environment, or other type of cloud environment.

In accordance with an embodiment, an analytic applications environment enables data analytics within the context of an organization's enterprise software application or data environment, or a software-as-a-service or other type of cloud environment; and supports the development of computer-executable software analytic applications.

In accordance with an embodiment, a data pipeline or process, such as, for example, an extract, transform, load process, can operate in accordance with an analytic applications schema adapted to address particular analytics use cases or best practices, to receive data from a customer's (tenant's) enterprise software application or data environment, for loading into a data warehouse instance.

In accordance with an embodiment, each customer (tenant) can additionally be associated with a customer tenancy and a customer schema. The data pipeline or process populates their data warehouse instance and database tables with data as received from their enterprise software application or data environment, as defined by a combination of the analytic applications schema, and their customer schema.

In accordance with an embodiment, a technical advantage of the described systems and methods includes that the use of a system-wide or shared analytic applications schema or data model, maintained within an analytic applications environment (cloud) tenancy; together with tenant-specific customer schemas, maintained within customer tenancies; enables each customer's (tenant's) data warehouse instance, or database tables, to be populated or otherwise associated with live data (live tables), as received from their enterprise software application or data environment, on an automated or a periodic, e.g., hourly/daily/weekly, or other basis, and reflecting best practices for particular analytics use cases. Examples of such analytics use cases can include Enterprise Resource Planning (ERP), Human Capital Management (HCM), Customer Experience (CX), Supply Chain Management (SCM), Enterprise Performance Management (EPM), or other types of analytics use cases. The populated data warehouse instance or database tables can then be used to create computer-executable software analytic applications, or to determine data analytics or other information associated with the data.

In accordance with an embodiment, a computer-executable software analytic application can be associated with a data pipeline or process, such as, for example, an extract, transform, load (ETL) process, or an extract, load, transform (ELT) process, maintained by a data integration component, such as, for example, an Oracle Data Integrator (ODI) environment, or other type of data integration component.

In accordance with an embodiment, the analytic applications environment can operate with a data warehouse environment or component, such as, for example, an Oracle Autonomous Data Warehouse (ADVV), Oracle Autonomous Data Warehouse Cloud (ADWC), or other type of data warehouse environment or component adapted to store large amounts of data; which can be populated via a star schema sourced from an enterprise software application or data environment, such as, for example, an Oracle Fusion Applications, or other type of enterprise software application or data environment. The data made available to each customer (tenant) of the analytic applications environment can be provisioned in an, e.g., ADWC, tenancy that is associated with, and accessible only to, that customer (tenant); while providing access to other features of a shared infrastructure.

For example, in accordance with an embodiment, the analytic applications environment can include a data pipeline or process layer that enables a customer (tenant) to ingest data extracted from their Oracle Fusion Applications environment, to be loaded into a data warehouse instance within their ADWC tenancy, including support for features such as multiple data warehouse schemas, data extract and target schemas, and monitoring of data pipeline or process stages; coupled with a shared data pipeline or process infrastructure that provides common transformation maps or repositories.

Introduction

In accordance with an embodiment, a data warehouse environment or component, such as, for example, an Oracle Autonomous Data Warehouse (ADVV), Oracle Autonomous Data Warehouse Cloud (ADWC), or other type of data warehouse environment or component adapted to store large amounts of data, can provide a central repository for storage of data collected by one or more business applications.

For example, in accordance with an embodiment, the data warehouse environment or component can be provided as a multi-dimensional database that employs online analytical processing (OLAP) or other techniques to generate business-related data from multiple different sources of data. An organization can extract such business-related data from one or more vertical and/or horizontal business applications, and inject the extracted data into a data warehouse instance that is associated with that organization, Examples of horizontal business applications can include ERP, HCM, CX, SCM, and EPM, as described above, and provide a broad scope of functionality across various enterprise organizations.

Vertical business applications are generally narrower in scope that horizontal business applications, but provide access to data that is further up or down a chain of data within a defined scope or industry. Examples of vertical business applications can include medical software, or banking software, for use within a particular organization.

Although software vendors increasingly offer enterprise software products or components as SaaS or cloud-oriented offerings, such as, for example, Oracle Fusion Applications; while other enterprise software products or components, such as, for example, Oracle ADWC, can be offered as one or more of SaaS, platform-as-a-service (PaaS), or hybrid subscriptions; enterprise users of conventional business intelligence (BI) applications and processes generally face the task of extracting data from their horizontal and vertical business applications, and introducing the extracted data into a data warehouse—a process which can be both time and resource intensive.

In accordance with an embodiment, the analytic applications environment allows customers (tenants) to develop computer-executable software analytic applications for use with a BI component, such as, for example, an Oracle Business Intelligence Applications (OBIA) environment, or other type of BI component adapted to examine large amounts of data sourced either by the customer (tenant) itself, or from multiple third-party entities.

For example, in accordance with an embodiment, when used with a SaaS business productivity software product suite that includes a data warehouse component, the analytic applications environment can be used to populate the data warehouse component with data from the business productivity software applications of the suite. Predefined data integration flows can automate the ETL processing of data between the business productivity software applications and the data warehouse, which processing might have been conventionally or manually performed by the users of those services.

As another example, in accordance with an embodiment, the analytic applications environment can be pre-configured with database schemas for storing consolidated data sourced across various business productivity software applications of a SaaS product suite. Such pre-configured database schemas can be used to provide uniformity across the productivity software applications and corresponding transactional databases offered in the SaaS product suite; while allowing the user to forgo the process of manually designing, tuning, and modeling the provided data warehouse.

As another example, in accordance with an embodiment, the analytic applications environment can be used to pre-populate a reporting interface of a data warehouse instance with relevant metadata describing business-related data objects in the context of various business productivity software applications, for example, to include predefined dashboards, key performance indicators (KPIs), or other types of reports.

Analytic Applications Environment

FIG. 1 illustrates a system for providing an analytic applications environment, in accordance with an embodiment.

As illustrated in FIG. 1, in accordance with an embodiment, an analytic applications environment 100 can be provided by, or otherwise operate at, a computer system having a computer hardware (e.g., processor, memory) 101, and including one or more software components operating as a control plane 102, and a data plane 104, and providing access to a data warehouse, or data warehouse instance 160.

In accordance with an embodiment, the components and processes illustrated in FIG. 1, and as further described herein with regard to various other embodiments, can be provided as software or program code executable by a computer system or other type of processing device.

For example, in accordance with an embodiment, the components and processes described herein can be provided by a cloud computing system, or other suitably-programmed computer system.

In accordance with an embodiment, the control plane operates to provide control for cloud or other software products offered within the context of a SaaS or cloud environment, such as, for example, an Oracle Analytics Cloud or Oracle Cloud Infrastructure environment, or other type of cloud environment.

For example, in accordance with an embodiment, the control plane can include a console interface 110 that enables access by a client computer device 10 having a device hardware 12, administrative application 14, and user interface 16, under control of a customer (tenant) 20 and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants).

For example, in accordance with an embodiment, the console interface can provide interfaces that allow customers to provision services for use within their SaaS environment, and to configure those services that have been provisioned.

In accordance with an embodiment, the provisioning component can include various functionality to provision services that are specified by provisioning commands.

For example, in accordance with an embodiment, the provisioning component can be accessed and utilized, via the console interface, by a customer (tenant) to purchase one or more of a suite of business productivity software applications, together with a data warehouse instance for use with those software applications.

In accordance with an embodiment, a customer (tenant) can request the provisioning of a customer schema 164 within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an ETL process that operates at the data plane, for example, by altering or updating a requested frequency of ETL process runs, for a particular customer (tenant).

In accordance with an embodiment, the provisioning component can also comprise a provisioning application programming interface (API) 112, a number of workers 115, a metering manager 116, and a data plane API 118, as further described below. The console interface can communicate, for example, by making API calls, with the provisioning API when commands, instructions, or other inputs are received at the console interface to provision services within the SaaS environment, or to make configuration changes to provisioned services.

In accordance with an embodiment, the data plane API can communicate with the data plane.

For example, in accordance with an embodiment, provisioning and configuration changes directed to services provided by the data plane can be communicated to the data plane via the data plane API.

In accordance with an embodiment, the metering manager can include various functionality that meters services and usage of services provisioned through control plane.

For example, in accordance with an embodiment, the metering manager can record a usage over time of processors provisioned via the control plane, for particular customers (tenants), for billing purposes. Likewise, the metering manager can record an amount of storage space of data warehouse partitioned for use by a customer of the SaaS environment, for billing purposes.

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example, a knowledge model (KM), or other type of data model, that the system uses to transform the transactional data received from business applications and corresponding transactional databases provisioned in the SaaS environment, into a model format understood by the analytic applications environment. The model format can be provided in any data format suited for storage in a data warehouse.

In accordance with an embodiment, the data pipeline or process, provided by the data plane, can including a monitoring component 122, a data staging component 124, a data quality component 126, and a data projection component 128, as further described below.

In accordance with an embodiment, the data transformation layer can include a dimension generation component 136, fact generation component 138, and aggregate generation component 140, as further described below. The data plane can also include a data and configuration user interface 130, and mapping and configuration database 132.

In accordance with an embodiment, the data warehouse can include a default analytic applications schema (referred to herein in accordance with some embodiments as an analytic warehouse schema) 162 and, for each customer (tenant) of the system, a customer schema as described above.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the analytic applications schema, which can be updated by a data pipeline or process, for example, an ETL process, on a periodic or other basis.

In accordance with an embodiment, to support multiple tenants, the system can enable the use of multiple data warehouses or data warehouse instances.

For example, in accordance with an embodiment, a first warehouse customer tenancy for a first tenant can comprise a first database instance, a first staging area, and a first data warehouse instance of a plurality of data warehouses or data warehouse instances; while a second customer tenancy for a second tenant can comprise a second database instance, a second staging area, and a second data warehouse instance of the plurality of data warehouses or data warehouse instances.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data.

For example, in accordance with an embodiment, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

As described above, in accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, based on the data model defined in the mapping and configuration database, the monitoring component can determine dependencies of several different data sets to be transformed. Based on the determined dependencies, the monitoring component can determine which of several different data sets should be transformed to the model format first.

For example, in accordance with an embodiment, if a first model dataset incudes no dependencies on any other model data set; and a second model data set includes dependencies to the first model data set; then the monitoring component can determine to transform the first data set before the second data set, to accommodate the second data set's dependencies on the first data set.

In accordance with an embodiment, the data transformation layer can transform extracted data into a format suitable for loading into a customer schema of data warehouse, for example according to the data model as described above. During the transformation, the data transformation can perform dimension generation, fact generation, and aggregate generation, as appropriate. Dimension generation can include generating dimensions or fields for loading into the data warehouse instance.

For example, in accordance with an embodiment, dimensions can include categories of data such as, for example, "name," "address," or "age". Fact generation includes the generation of values that data can take, or "measures." Facts are associated with appropriate dimensions in the data warehouse instance. Aggregate generation includes creation of data mappings which compute aggregations of the transformed data to existing data in the customer schema 164 of data warehouse instance.

In accordance with an embodiment, once any transformations are in place (as defined by the data model), the data pipeline or process can read the source data, apply the transformation, and then push the data to the data warehouse instance.

In accordance with an embodiment, data transformations can be expressed in rules, and once the transformations take place, values can be held intermediately at the staging area, where the data quality component and data projection components can verify and check the integrity of the transformed data, prior to the data being uploaded to the customer schema at the data warehouse instance. Monitoring can be provided as the extract, transform, load process runs, for example, at a number of compute instances or virtual machines. Dependencies can also be maintained during the extract, transform, load process, and the data pipeline or process can attend to such ordering decisions.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Horizontally and vertically integrated business software applications are generally directed to capturing of data in real time. This is a result of horizontally and vertically integrated business software applications being generally used for daily workflow, and storing data in a transactional database, which means that only the most current data is generally stored in such databases.

For example, while a HCM application might update a record associated with an employee when the employee transfers offices, such HCM application would generally not maintain a record of each office that the employee had worked in during their tenure with a company. As such, a BI-related query seeking to determine employee mobility within a company would not have adequate records within the transaction database to complete such a query.

In accordance with an embodiment, by storing historical, in addition to current data, generated by the horizontally and vertically integrated business software applications, in a context that is readily understandable by BI applications, the data warehouse instance as populated using the above technique provides a resource for BI applications to process such queries, using an interface provided, for example, by a business productivity and analytics product suite, or by a SQL tool of the customer's choice.

Data Pipeline Process

Figure 2:
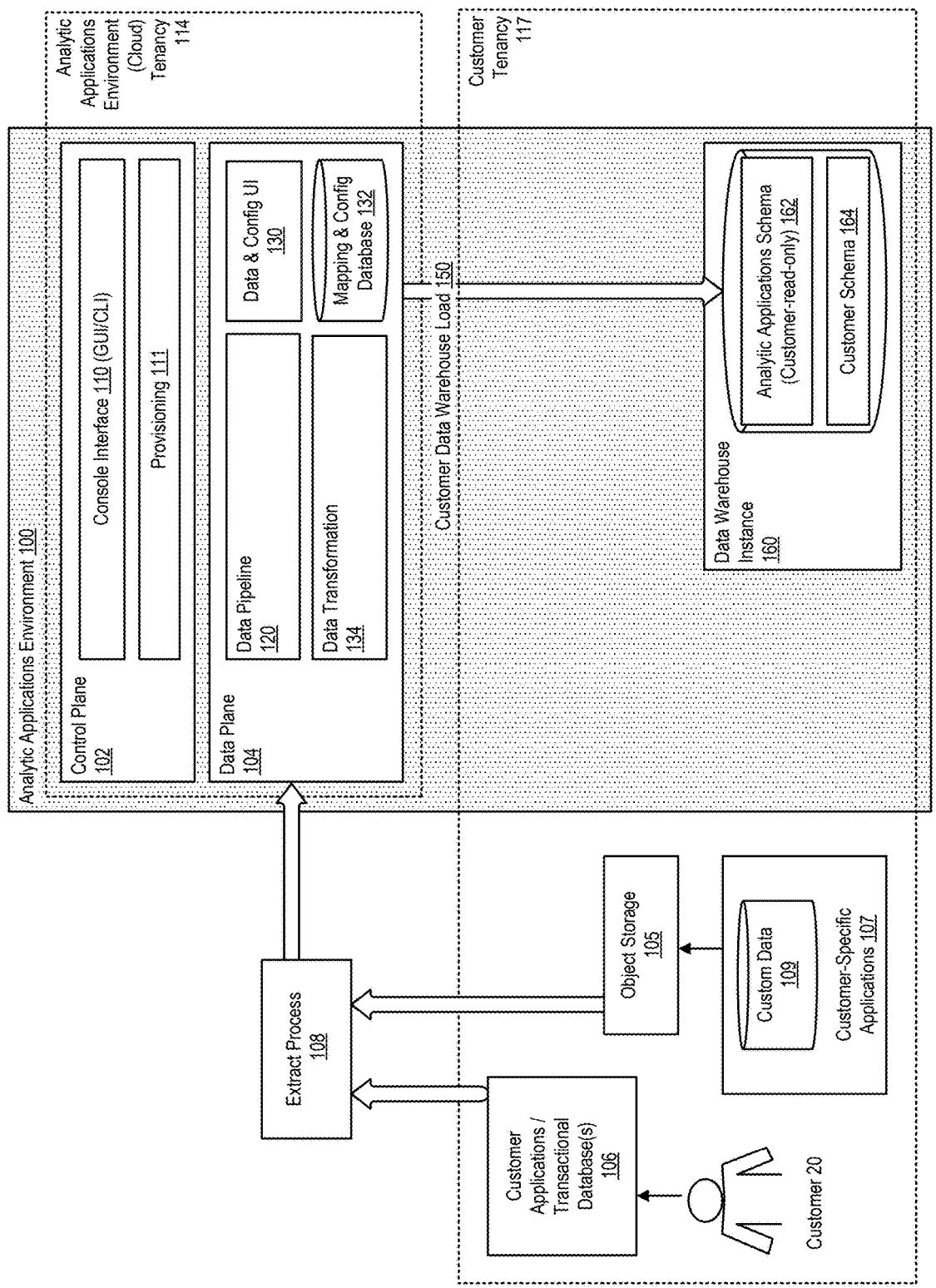
FIG. 2 further illustrates a system for providing an analytic applications environment, in accordance with an embodiment.

FIG. 2 further illustrates a system for providing an analytic applications environment, in accordance with an embodiment.

As illustrated in FIG. 2, in accordance with an embodiment, data can be sourced, e.g., from a customer's (tenant's) enterprise software application or data environment (106), using the data pipeline process as described above; or as custom data 109 sourced from one or more customer-specific applications 107; and loaded to a data warehouse instance, including in some examples the use of an object storage 105 for storage of the data.

In accordance with an embodiment, the data pipeline or process maintains, for each customer (tenant), an analytic applications schema, e.g., as a star schema, that is updated on a periodic or other basis, by the system in accordance with best practices for a particular analytics use case, e.g., human capital management (HCM) analytics, or enterprise resource planning (ERP) analytics.

In accordance with an embodiment, for each customer (tenant), the system uses the analytic applications schema that is maintained and updated by the system, within an analytic applications environment (cloud) tenancy 114, to pre-populate a data warehouse instance for the customer, based on an analysis of the data within that customer's enterprise applications environment, and within a customer tenancy 117. As such, the analytic applications schema maintained by the system enables data to be retrieved, by the data pipeline or process, from the customer's environment, and loaded to the customer's data warehouse instance in a "live" manner.

In accordance with an embodiment, the analytic applications environment also provides, for each customer of the environment, a customer schema that is readily modifiable by the customer, and which allows the customer to supplement and utilize the data within their own data warehouse instance. For each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics For example, in accordance with an embodiment, a data warehouse (e.g., an Oracle Autonomous Data Warehouse, ADWC) can include an analytic applications schema and, for each customer/tenant, a customer schema sourced from their enterprise software application or data environment. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline or process can insert the extracted data into a data staging area for the tenant, which can act as a temporary staging area for the extracted data. A data quality component and data protection component can be used to ensure the integrity of the extracted data; for example by performing validations on the extracted data while the data is temporarily held in the data staging area. When the extract process has completed its extraction, the data transformation layer can be used to begin the transformation process, to transform the extracted data into a model format to be loaded into the customer schema of the data warehouse.

Extraction, Transformation, Load/Publish

Figure 3:
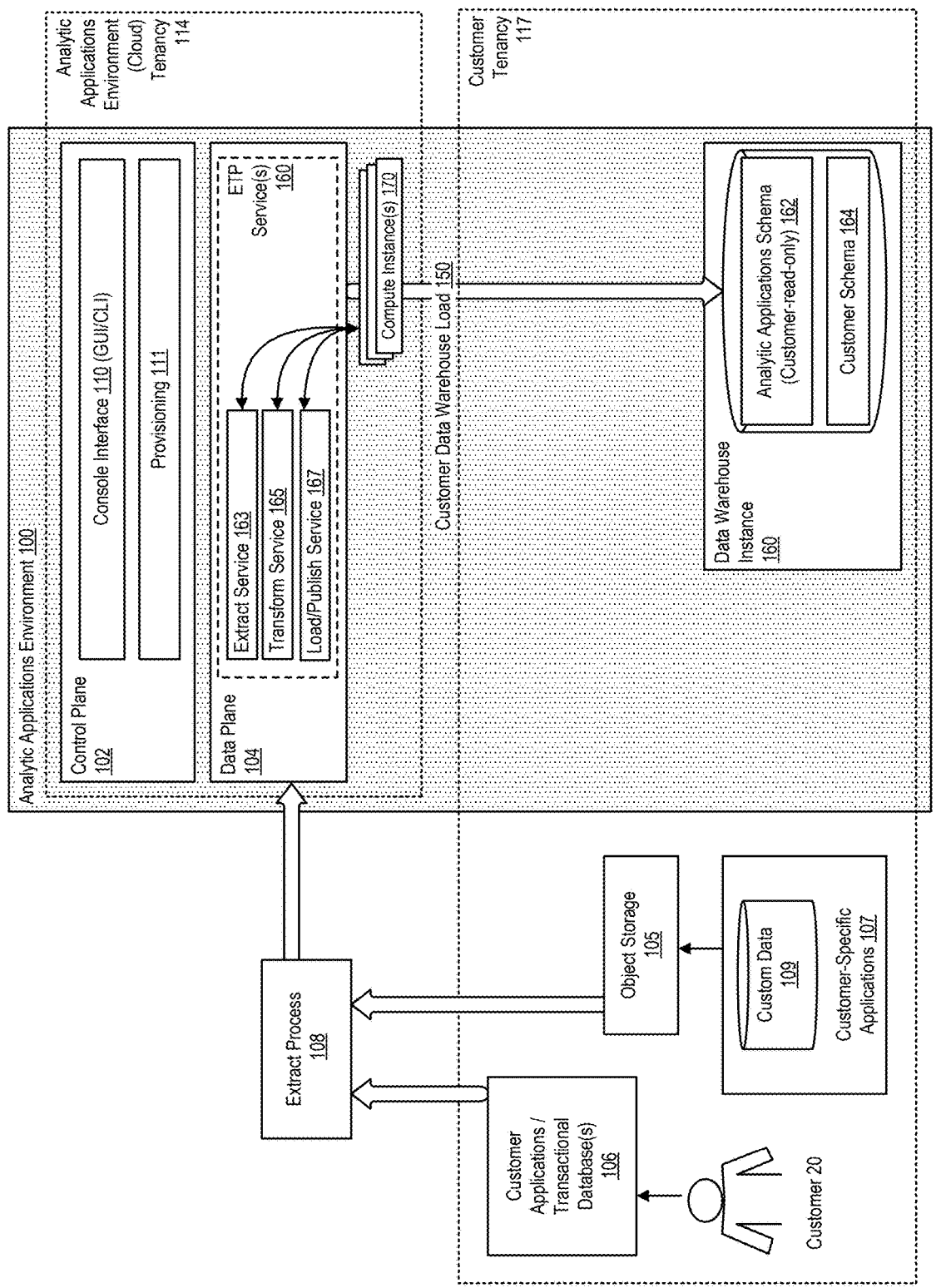
FIG. 3 further illustrates a system for providing an analytic applications environment, in accordance with an embodiment.

FIG. 3 further illustrates a system for providing an analytic applications environment, in accordance with an embodiment.

As illustrated in FIG. 3, in accordance with an embodiment, the process of extracting data, e.g., from a customer's (tenant's) enterprise software application or data environment, using the data pipeline process as described above; or as custom data sourced from one or more customer-specific applications; and loading the data to a data warehouse instance, or refreshing the data in a data warehouse, generally involves three broad stages, performed by an ETP service 160 or process, including one or more extraction service 163; transformation service 165; and load/publish service 167, executed by one or more compute instance(s) 170.

Extraction: in accordance with an embodiment, a list of view objects for extractions can be submitted, for example, to an Oracle BI cloud connector (BICC) component via a ReST call. The extracted files can be uploaded to an object storage component, such as, for example, an Oracle Storage Service (OSS) component, for storage of the data.

Transformation: In accordance with an embodiment, the transformation process takes the data files from object storage component (e.g., OSS), and applies a business logic while loading them to a target data warehouse, e.g., an ADWC database, which is internal to the data pipeline or process, and is not exposed to the customer (tenant).

Load/Publish: In accordance with an embodiment, a load/publish service or process takes the data from the, e.g., ADWC database or warehouse, and publishes it to a data warehouse instance that is accessible to the customer (tenant).

Multiple Customers (Tenants)

Figure 4:
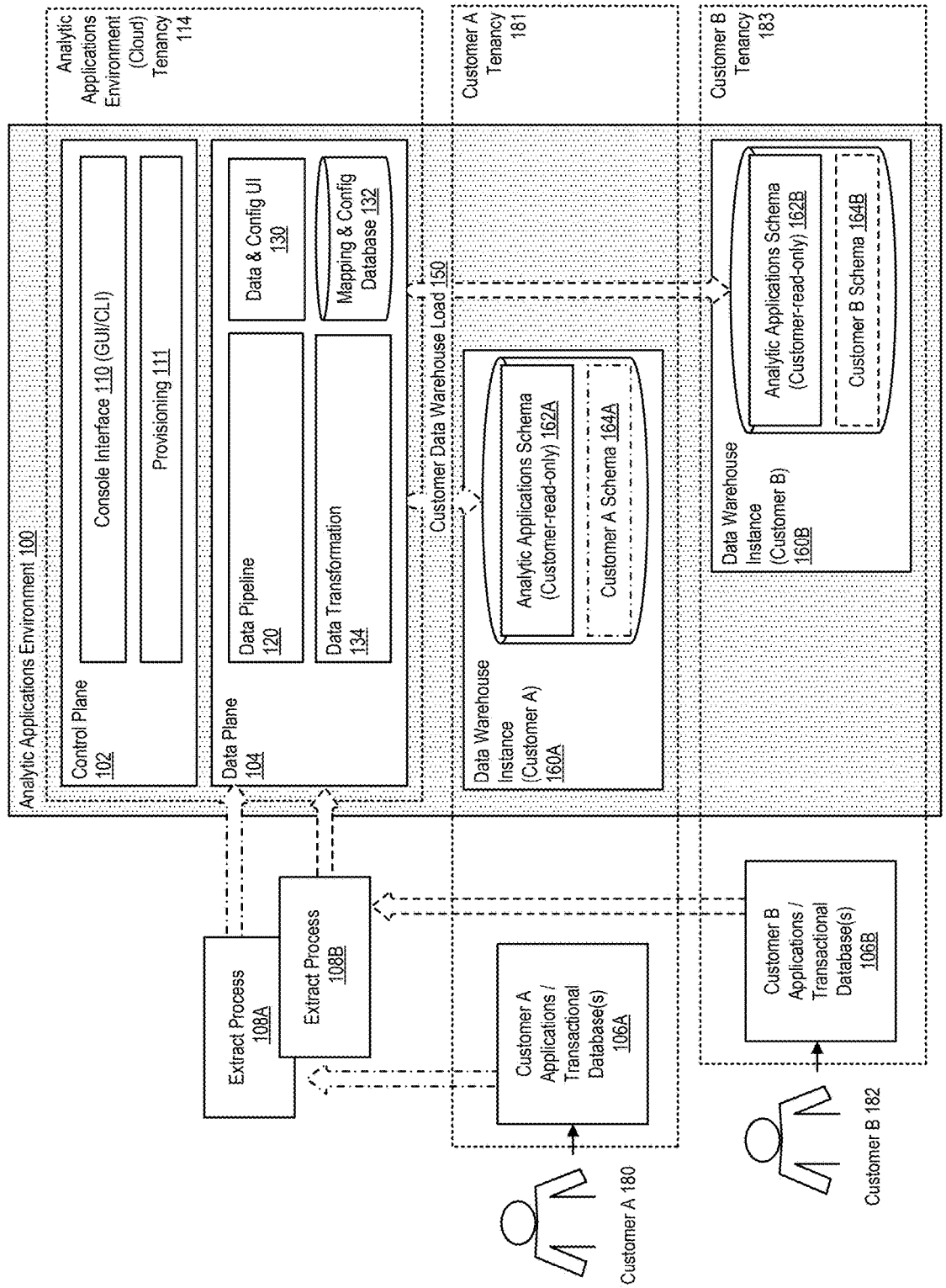
FIG. 4 further illustrates a system for providing an analytic applications environment, in accordance with an embodiment.

FIG. 4 further illustrates a system for providing an analytic applications environment, in accordance with an embodiment.

As illustrated in FIG. 4, which illustrates the operation of the system with a plurality of tenants (customers) in accordance with an embodiment, data can be sourced, e.g., from each of a plurality of customer's (tenant's) enterprise software application or data environment, using the data pipeline process as described above; and loaded to a data warehouse instance.

In accordance with an embodiment, the data pipeline or process maintains, for each of a plurality of customers (tenants), for example customer A 180, customer B 182, an analytic applications schema that is updated on a periodic or other basis, by the system in accordance with best practices for a particular analytics use case.

In accordance with an embodiment, for each of a plurality of customers (e.g., customers A, B), the system uses the analytic applications schema 162A, 162B, that is maintained and updated by the system, to pre-populate a data warehouse instance for the customer, based on an analysis of the data within that customer's enterprise applications environment 106A, 106B, and within each customer's tenancy (e.g., customer A tenancy 181, customer B tenancy 183); so that data is retrieved, by the data pipeline or process, from the customer's environment, and loaded to the customer's data warehouse instance 160A, 160B.

In accordance with an embodiment, the analytic applications environment also provides, for each of a plurality of customers of the environment, a customer schema (e.g., customer A schema 164A, customer B schema 164B) that is readily modifiable by the customer, and which allows the customer to supplement and utilize the data within their own data warehouse instance.

As described above, in accordance with an embodiment, for each of a plurality of customers of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases. When the extract process 108A, 108B for a particular customer has completed its extraction, the data transformation layer can be used to begin the transformation process, to transform the extracted data into a model format to be loaded into the customer schema of the data warehouse.

Activation Plans

Figure 5:
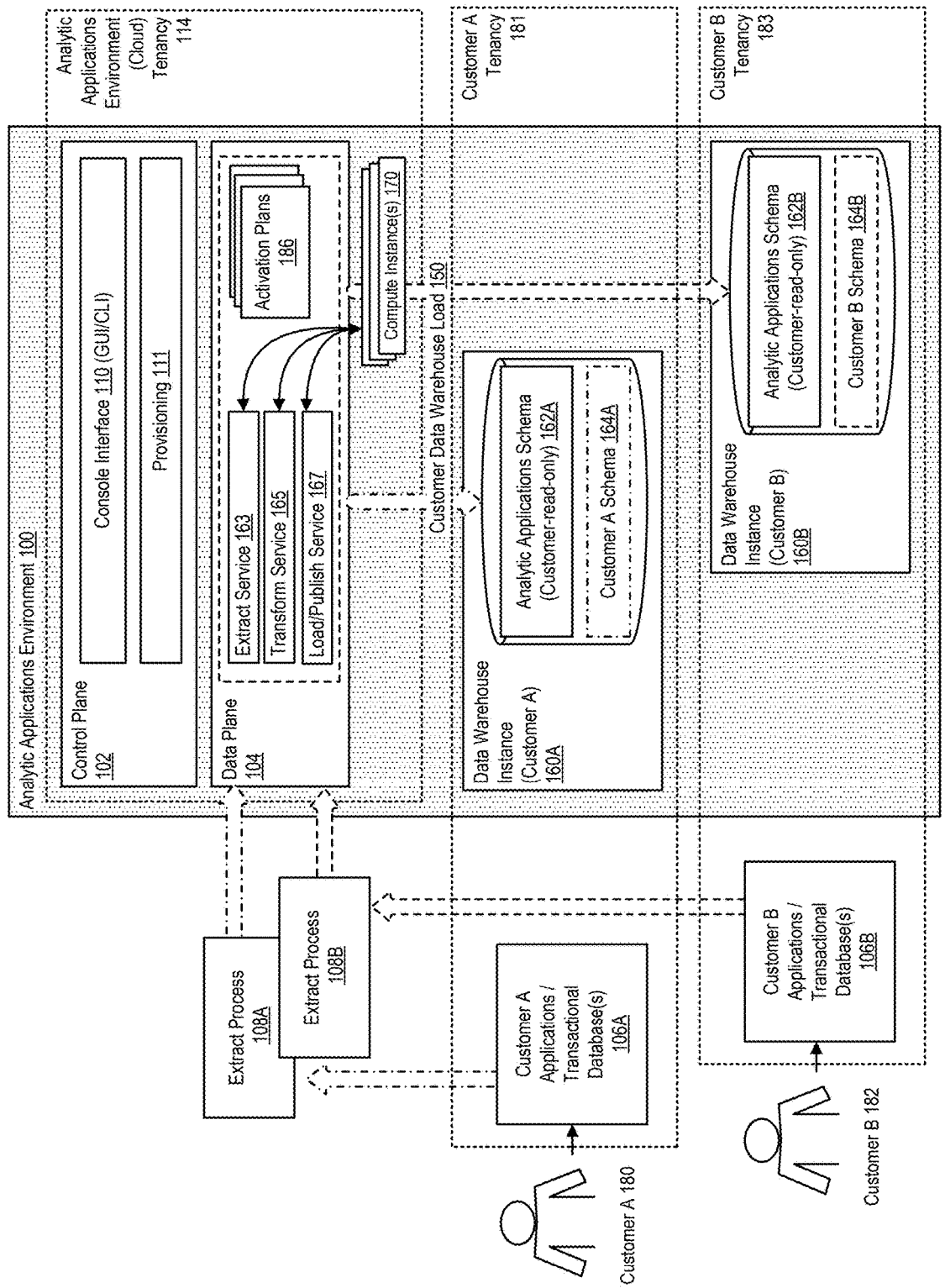
FIG. 5 further illustrates a system for providing an analytic applications environment, in accordance with an embodiment.

FIG. 5 further illustrates a system for providing an analytic applications environment, in accordance with an embodiment.

In accordance with an embodiment, activation plans 186 can be used to control the operation of the data pipeline or process services for a customer, for a particular functional area, to address that customer's (tenant's) particular needs.

For example, in accordance with an embodiment, an activation plan can define a number of extract, transform, and load (publish) services or steps to be run in a certain order, at a certain time of day, and within a certain window of time.

In accordance with an embodiment, each customer can be associated with their own activation plan(s). For example, an activation plan for a first Customer A can determine the tables to be retrieved from that customer's enterprise software application environment (e.g., their Fusion Applications environment), or determine how the services and their processes are to run in a sequence; while an activation plan for a second Customer B can likewise determine the tables to be retrieved from that customer's enterprise software application environment, or determine how the services and their processes are to run in a sequence.

In accordance with an embodiment, activation plans can be stored in the mapping and configuration database and are customizable by the customer via the data and configuration UI. Each customer can have a number of activation plans. Compute instances/services (virtual machines) which execute the ETL process for various customers, according to their activation plans, can be dedicated to a particular service for the use of an activation plan, and then released for use by other services and activation plans.

In accordance with an embodiment, based on a determination of historical performance data recorded over a period of time, the system can optimize the execution of activation plans, e.g., for one or more functional areas associated with a particular tenant, or across a sequence of activation plans associated with multiple tenants, to address utilization of the VMs and service level agreements (SLAs) for those tenants. Such historical data can include statistics of load volumes and load times.

For example, in accordance with an embodiment, the historical data can include size of extraction, count of extraction, extraction time, size of warehouse, transform time, publish (load) time, view object extract size, view object extract record count, view object extract time, warehouse table count, count of records processed for a table, warehouse table transform time, publish table count, and publish time. Such historical data can be used to estimate and plan current and future activation plans in order to organize various tasks to, such as, for example, run in sequence or in parallel to arrive at a minimum time to run an activation plan. In addition, the gathered historical data can be used to optimize across multiple activation plans for a tenant. In some embodiments, the optimization of activation plans (i.e., a particular sequence of jobs, such as ETLs) based upon historical data can be automatic.

ETL Process Flow

Figure 6:
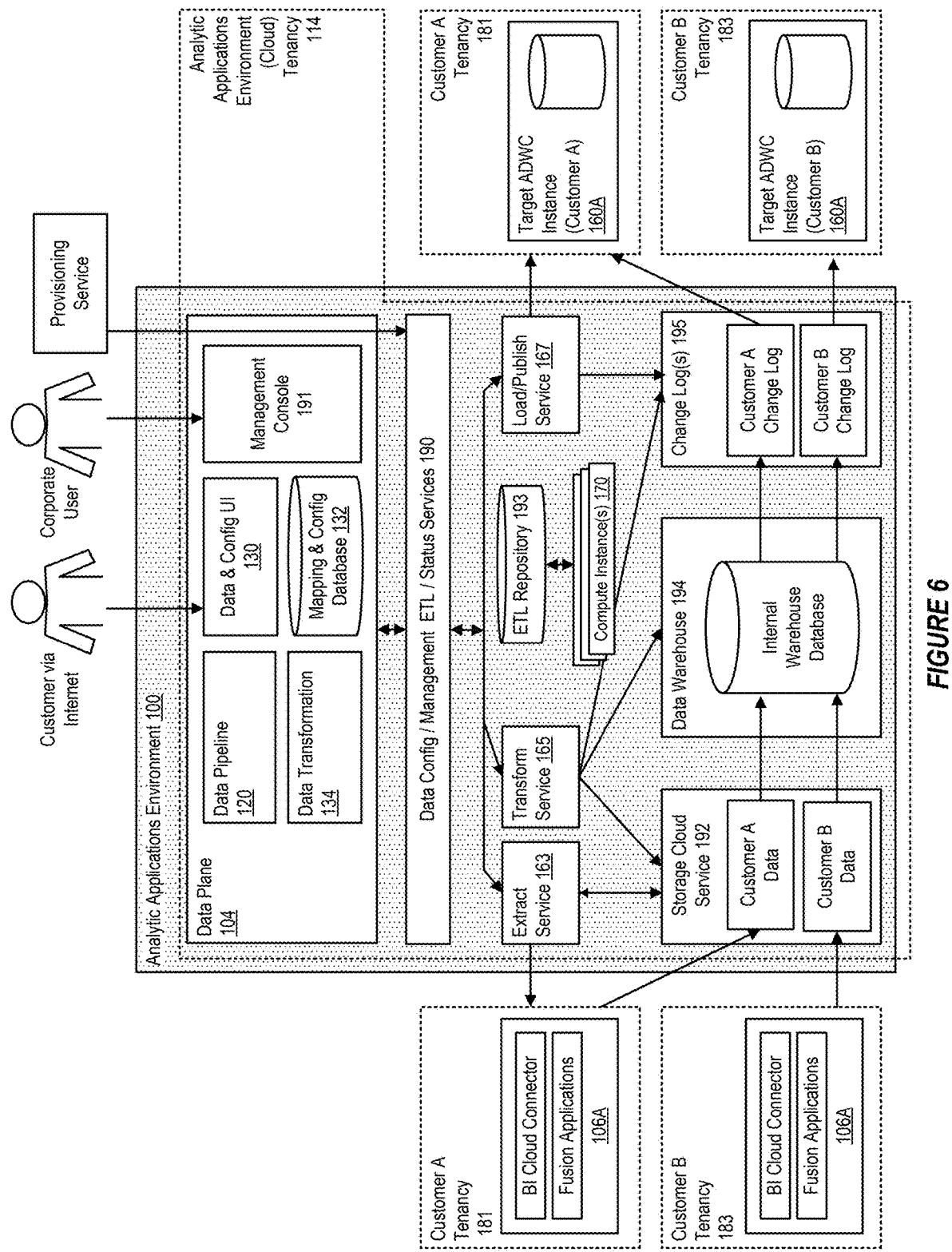
FIG. 6 further illustrates a system for providing an analytic applications environment, in accordance with an embodiment.

FIG. 6 further illustrates a system for providing an analytic applications environment, in accordance with an embodiment.

As illustrated in FIG. 6, in accordance with an embodiment, the system enables a flow of data, controlled by a data config/management/ETU/status services 190 within an (e.g., Oracle) managed tenancy, from each customer's enterprise software application environment (e.g., their Fusion Applications environment), including in this example, a BICC component, via a storage cloud service 192, e.g., OSS, and from there to a data warehouse instance.

As described above, in accordance with an embodiment, the flow of data can be managed by one or more services, including for example, an extract service, and a transform service as described above, and with reference to an ETL repository 193, that takes the data from the storage cloud service, and loads the data into an internal target data warehouse (e.g., an ADWC database) 194, which is internal to the data pipeline or process and is not exposed to the customer.

In accordance with an embodiment, data is moved in stages into the data warehouse, and thereafter into database table change logs 195, from where the load/publish service can load the customer data into a target data warehouse instance associated with and accessible by the customer, within its customer tenancy.

ETL Stages

Figure 7:
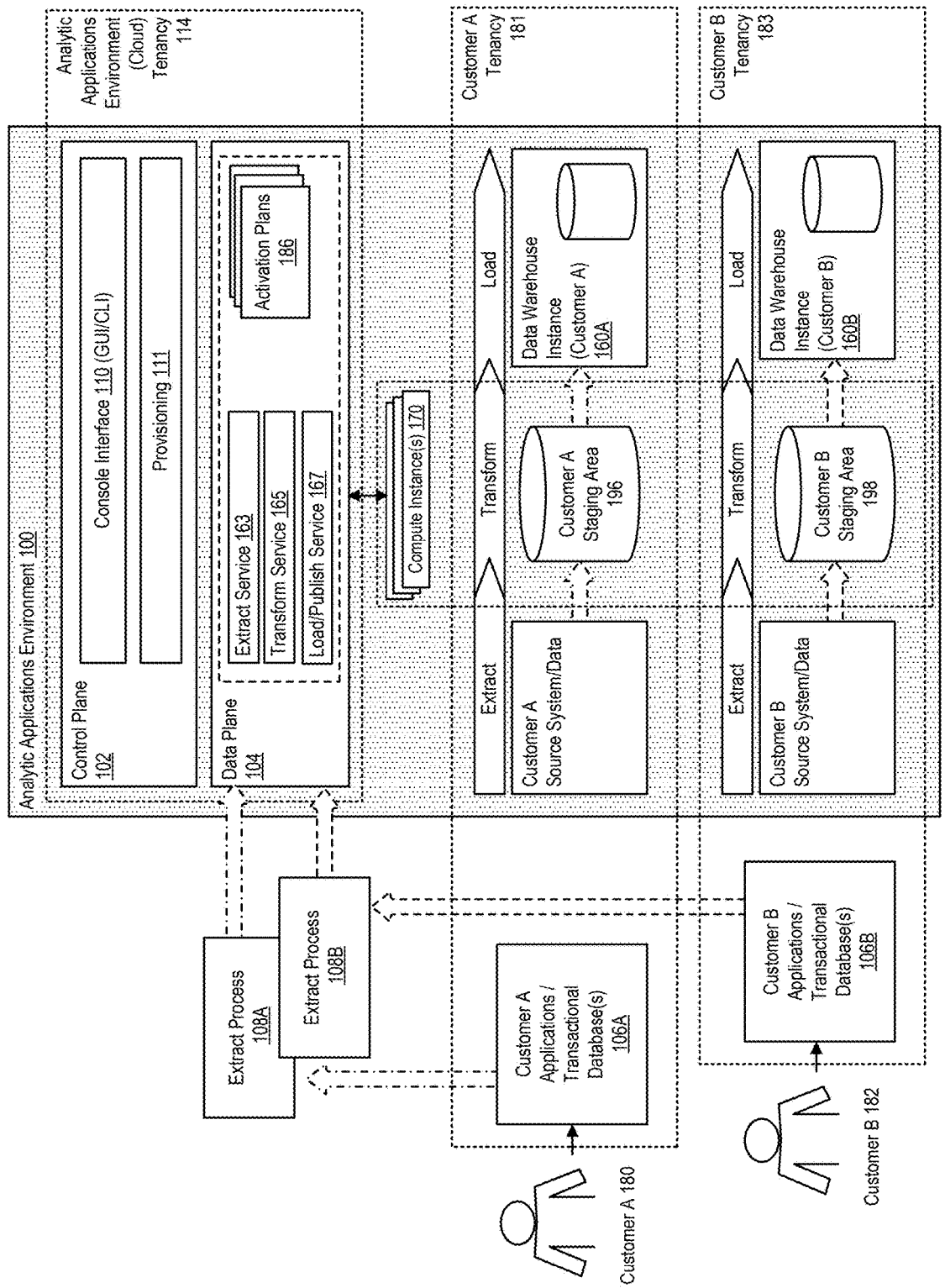
FIG. 7 further illustrates a system for providing an analytic applications environment, in accordance with an embodiment.

FIG. 7 further illustrates a system for providing an analytic applications environment, in accordance with an embodiment.

In accordance with an embodiment, the extracting, transforming and loading data from enterprise applications to a data warehouse instance involves multiple stages, and each stage can have several sequential or parallel jobs; and run on different spaces/hardware, including different staging areas 196, 198 for each customer.

Analytic Applications Environment Metrics

Figure 8:
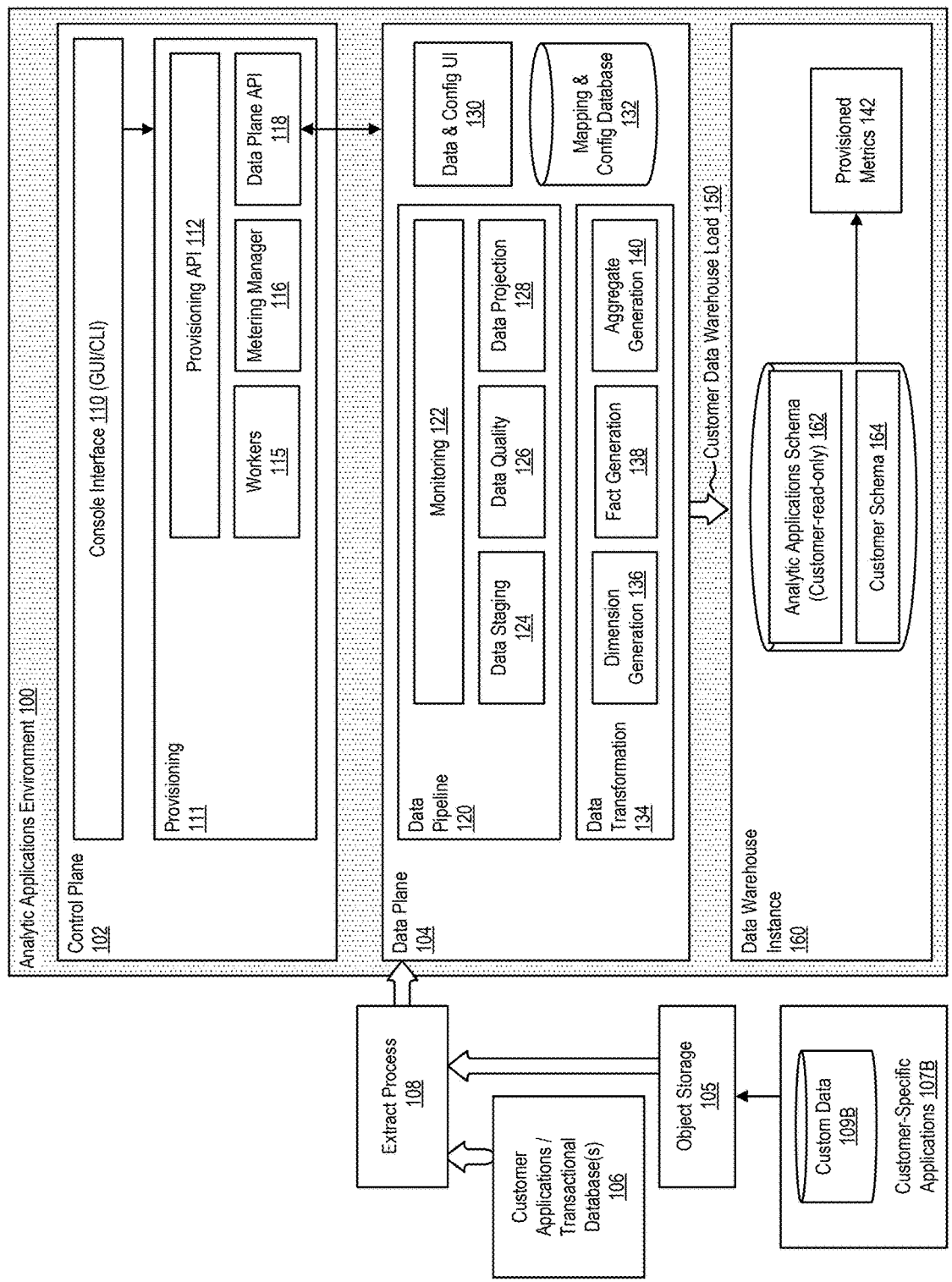
FIG. 8 further illustrates a system for providing an analytic applications environment, in accordance with an embodiment.

FIG. 8 further illustrates a system for providing an analytic applications environment, in accordance with an embodiment.

As illustrated in FIG. 8, in accordance with an embodiment, the metering manager can include functionality that meters services and usage of services provisioned through the control plane, and provide provisioned metrics 142.

For example, the metering manager can record a usage over time of processors provisioned via the control plane, for particular customers, for billing purposes. Likewise, the metering manager can record an amount of storage space of data warehouse partitioned for use by a customer of the SaaS environment, for billing purposes.

Analytic Applications Environment Customization

Figure 9:
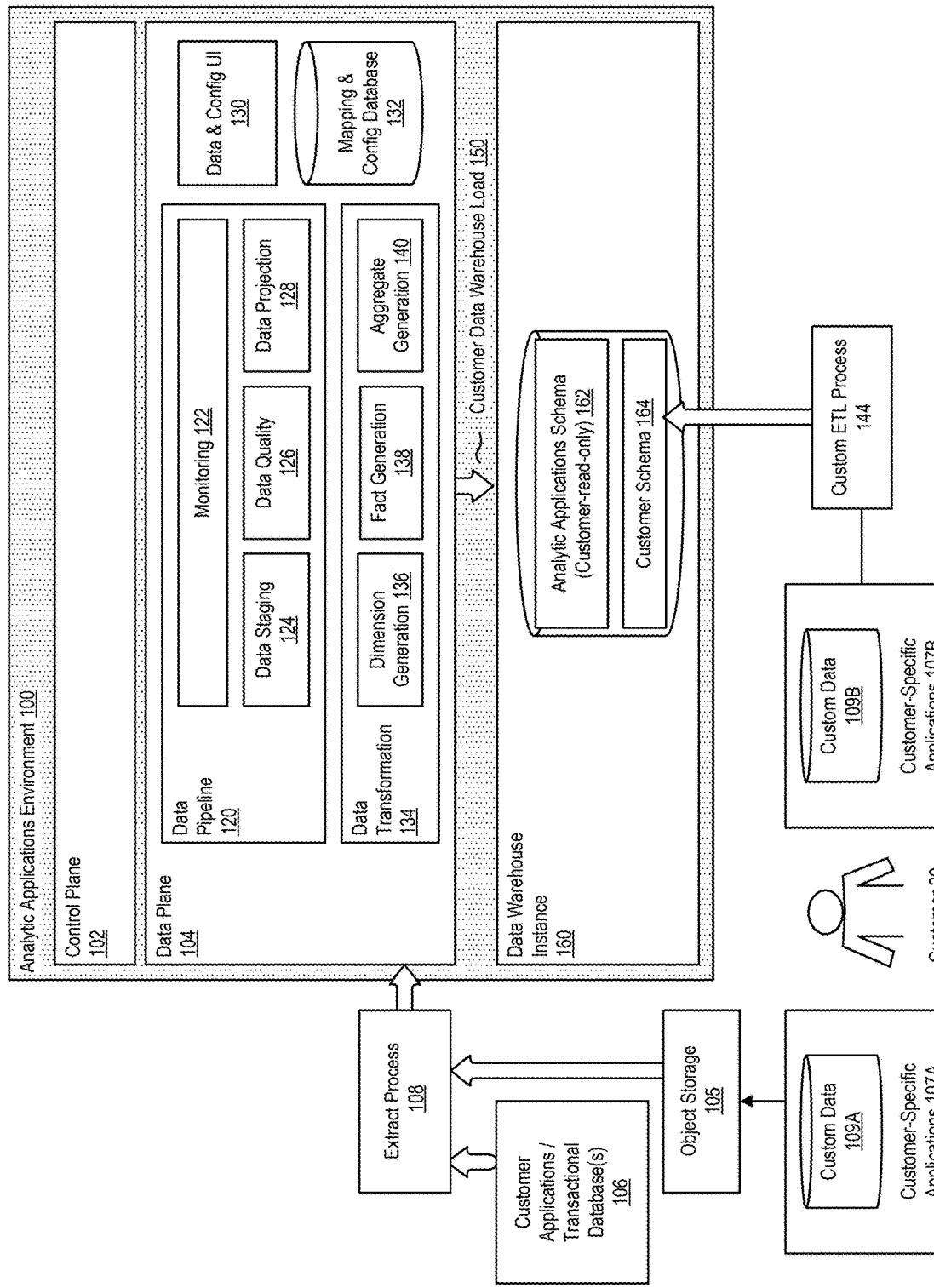
FIG. 9 further illustrates a system for providing an analytic applications environment, in accordance with an embodiment.

FIG. 9 further illustrates a system for providing an analytic applications environment, in accordance with an embodiment.

As illustrated in FIG. 9, in accordance with an embodiment, in addition to data that can be sourced, e.g., from a customer's enterprise software application or data environment, using the data pipeline process as described above; one or more additional custom data 109A, 109B, that is sourced from one or more customer-specific applications 107A, 107B, can also be extracted, transformed, and loaded to a data warehouse instance, using either: the data pipeline process as described above, including in some examples the use of an object storage for storage of the data; and/or a custom ETL or other process 144 that is mutable from the customer's perspective. Once data has been loaded into their data warehouse instance, customers can create business database views that combine tables from both their customer schema and the software analytic applications schema; and can query their data warehouse instance using an interface provided, for example, by a business productivity and analytics product suite, or by a SQL tool of the customer's choice.

Analytic Applications Environment Method

Figure 10:
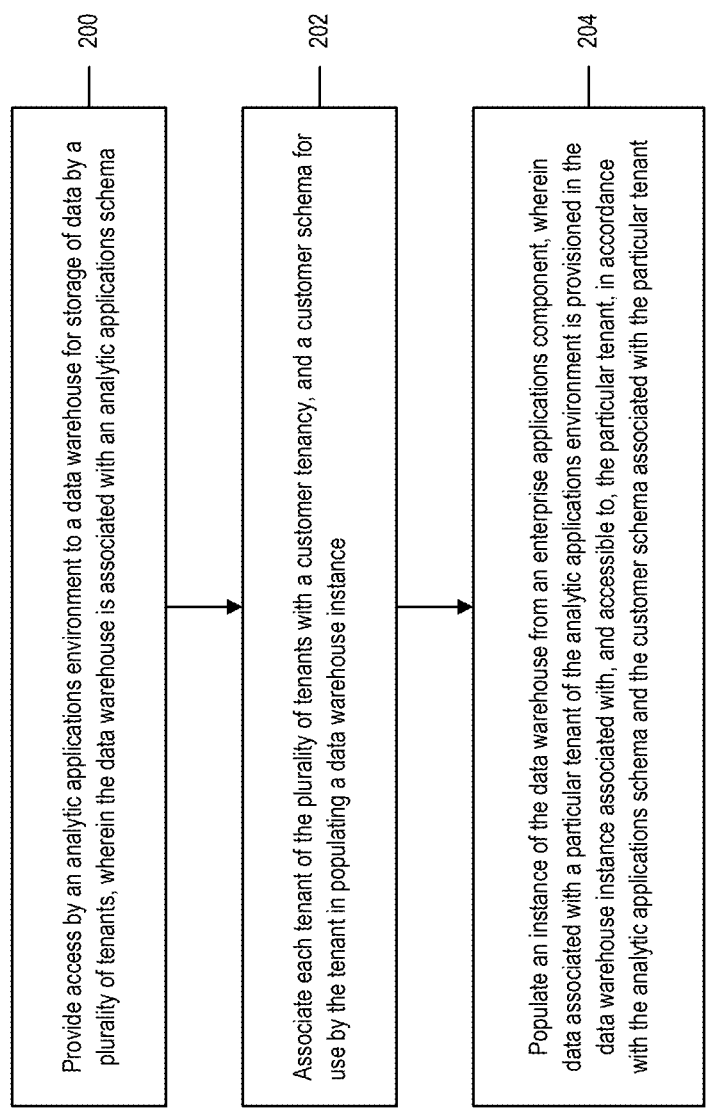
FIG. 10 illustrates a flowchart of a method for providing an analytic applications environment, in accordance with an embodiment.

FIG. 10 illustrates a flowchart of a method for providing an analytic applications environment, in accordance with an embodiment.

As illustrated in FIG. 10, in accordance with an embodiment, at step 200, an analytic applications environment provides access to a data warehouse for storage of data by a plurality of tenants, wherein the data warehouse is associated with an analytic applications schema.

At step 202, each tenant of the plurality of tenants is associated with a customer tenancy, and a customer schema for use by the tenant in populating a data warehouse instance.

At step 204, an instance of the data warehouse is populated with data received from an enterprise software application or data environment, wherein data associated with a particular tenant of the analytic applications environment is provisioned in the data warehouse instance associated with, and accessible to, the particular tenant, in accordance with the analytic applications schema and the customer schema associated with the particular tenant.

Hybrid SaaS/PaaS Model

In accordance with an embodiment, the control plane can operate to provide control for cloud products offered within a SaaS environment. For example, the console interface can provide interfaces that allow customers to provision services for use within their SaaS environment, and to configure those services that have been provisioned. The provisioning component can include functionality to provision the services specified in the provisioning commands. For example, the provisioning component can be accessed and utilized, via the console interface, by a customer (tenant) to purchase one or a suite of applications, together with a data warehouse instance.

Figure 11:
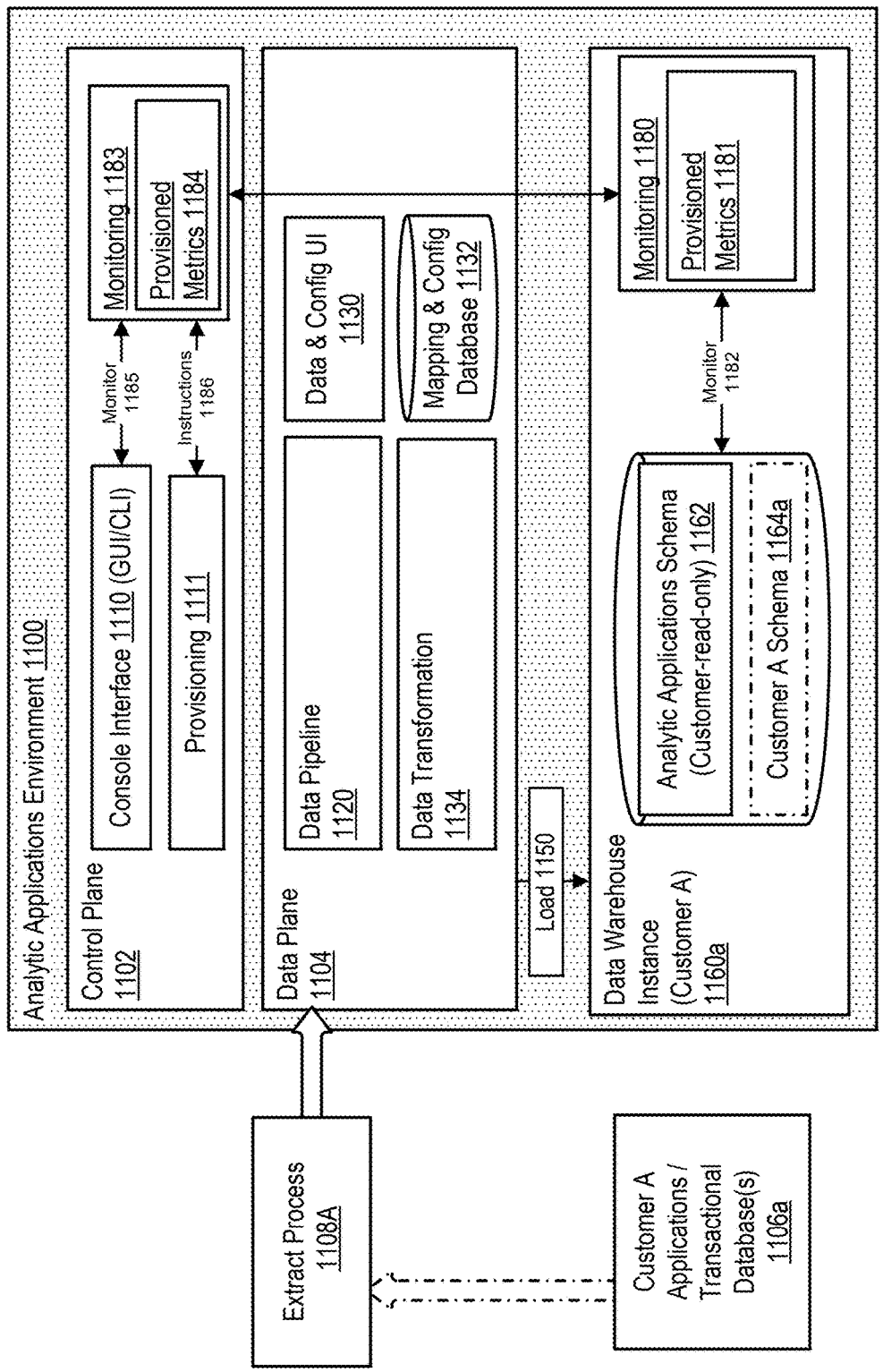
FIG. 11 illustrates a system for SaaS/PaaS resource usage and allocation in an analytic applications environment, in accordance with an embodiment.

FIG. 11 illustrates a system for SaaS/PaaS resource usage and allocation in an analytic applications environment, in accordance with an embodiment.

As illustrated in FIG. 11, a control plane 1102 provides control, e.g., for cloud products offered within a SaaS environment; and can include a console interface 1110, that enables access by a client (computer) device under control of a customer/tenant; and a provisioning component 1111.

In accordance with an embodiment, for example, a customer can request a provisioning of a data warehouse instance. The provisioning component can then provision the requested data warehouse instance (including a customer schema); and populate the warehouse with the necessary information supplied by the customer. This can represent, for example, part of a PaaS component.

In accordance with an embodiment, for example, said provisioning additionally be used to, based upon, for example, a purchase order, provision a number of seats, as well number of compute units available to said provisioning customer. This can represent, for example, part of a SaaS component.

In accordance with an embodiment, each such provisioned resource, including database instances, seats, compute units . . . etc, can be tagged for each respective tenant (or sub-tenant) of the system.

As further illustrated in FIG. 11, a data plane 1104 can include a data pipeline (e.g., an extract, transform, load (ETL) process) 1120 and a data transformation layer 1134, which together operate to extract 1108a, process, and load 1150, operational or transactional data from customer enterprise applications or transaction database environments, e.g., Oracle Fusion Applications environments, into data warehouse instances. The data plane can also include a data and configuration user interface 1130, and a mapping and configuration database 1132.

In accordance with an embodiment, while the embodiment depicted in FIG. 11 only shows one tenant, customer A represented by 1106a, as described above, such systems and methods can support a plurality of tenants. Said depiction of just one tenant is for the sake of clarity in the drawing.

In accordance with an embodiment, the data pipeline maintains, for each customer/tenant (e.g., customers A associated with customer A applications/transactional database 1106a), an analytic applications schema 1162, e.g., as a star schema, that is periodically updated (e.g., hourly/daily/weekly) by the system in accordance with best practices for a particular analytic use case, e.g., human capital management (HCM) analytics, or enterprise resource planning (ERP) analytics.

In accordance with an embodiment, the data transformation layer can include a data model (e.g., a knowledge model, KM, or other type of data model) that the system uses to transform the transactional data received from the enterprise or business application, into a model format, for loading into the data warehouse.

In accordance with an embodiment, for each customer, the system uses the analytic applications schema, that is maintained and updated by the system, to pre-populate a data warehouse instance for the customer, based on an analysis of the data within that customer's enterprise applications environment, e.g., 1106a.

In accordance with an embodiment, as such, the analytic applications schema maintained by the system enables data to be retrieved, by the data pipeline, from the customer's environment, and loaded to the customer's data warehouse instance 1160a, in a "live" manner; but is otherwise made accessible to customers in a read-only manner, and is not directly modifiable by the customer.

In accordance with an embodiment, the analytic applications environment also provides, for each customer of the environment, a customer schema, such as 1164a, that is readily modifiable by the customer, and which allows the customer to supplement and utilize the data within their own data warehouse instance.

In accordance with an embodiment, for each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics In accordance with an embodiment, for example, a data warehouse (e.g., an Oracle Autonomous Data Warehouse, ADWC) can include a default analytic applications schema (analytic warehouse schema) and, for each customer/tenant, a customer schema sourced from their enterprise applications component. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline can insert the extracted data into a data staging area for the tenant, which can act as a temporary staging area for the extracted data. A data quality component and data protection component can be used to ensure the integrity of the extracted data; for example, by performing validations on the extracted data while the data is temporarily held in the data staging area.

When the extract process has completed its extraction, the data transformation layer can be used to begin the transformation process, to transform the extracted data into a model format to be loaded into the customer schema of the data warehouse Using the provisioning component, a customer can request the provisioning of a customer schema 1164 within the data warehouse. The customer can also supply, via the console interface, a number of attributes associated with the data warehouse, including required attributes (e.g., login credentials), and optional attributes (e.g., size, speed, number of seats). The provisioning component can then provision the requested data warehouse (e.g., customer schema of the data warehouse), and populate the warehouse with the necessary information supplied by the customer.

Such provisioning can be based upon, for example, a purchase order, including a number of seats, as well as a database size and a number of compute units. Such provisioned components can be tagged to each tenant of a system.

In accordance with an embodiment, a monitoring agent 1180 can be provided in association with the data warehouse instance 1160*a* (e.g., at the data warehouse, or at the control plane). Such a monitoring agent 1183 can additionally be provided at the control plane. (In accordance with an embodiment, while shown within the Figure as two separate components, monitoring agent 1180 and 1183 can be considered to be a single entity, where the communication line between 1180 and 1183 illustrate the nature of the SaaS/PaaS relationship).

In accordance with an embodiment, the monitoring agent(s) can have access to the provisioned metrics associated with the tenant/customer. The monitoring agent 1180 1183 can be responsible for monitoring 1182/1185 (e.g., dynamically, at set, configurable intervals, hourly, daily, etc.) the use of resources by the tenant/customer at the data warehouse (e.g., monitoring storage used by a customer/tenant at the associated data warehouse instance) and/or at the control plane (e.g., monitoring usage of compute units by a customer/tenant for use in analytics) by, for example, monitoring resources tagged by each tenant of the system. This can include, for example, monitoring and metering the customer's use of compute units in relation to the provisioned metrics, or metering the number of seats in use by a customer in relation to the provisioned metrics.

In accordance with an embodiment, the monitoring agent can use the provisioned metrics 1181/1184 (e.g., those resources provisioned or allocated to a customer/tenant in response to a provisioning by the customer/tenant) in monitoring and tracking the resource utilization by a tenant, which can provide for improved resource allocation within the systems. That is, as each tenant has the various resources provisioned to it tagged as being associated with each tenant, the monitoring agent can, via tracking the tagged (where each resourced allocated to a tenant is tagged so as to identify it as belonging to, or being allocated to, said tenant) resources, determine the resource usage for each tenant. In addition, the monitoring agent can provided a notification/instructions 1186 to the provisioning component 1111, or other back end systems, that a tenant has exceeded its provisioned resources, or that a given tenant should be provided with additional resources (e.g., compute units) for a set amount of time, given the monitored metrics associated with a tenant. Likewise, the monitoring agent 1180/1183 can provide instructions 1188 that a customer/tenant has been allocated too many resources (beyond those provisioned), which are not being utilized. In such cases, then, the provisioning component can reclaim such resources in order to, e.g., save utilization and/or provision such resources to a different tenant/customer.

In accordance with an embodiment, for example, suppose a tenant has provisioned 20 seats and 4 compute units. During a high period of high usage, a monitoring agent detects that the tenant is utilizing more than the provisioned components, via tags associated with the tenant. In such a case, the monitoring agent can detect that the tenant is utilizing more than, for example, 4 compute units, and trigger a provisioning of additional compute resources accordingly. On such provisioning, the monitoring agent can also provide a notification of such usage.

Figure 12:
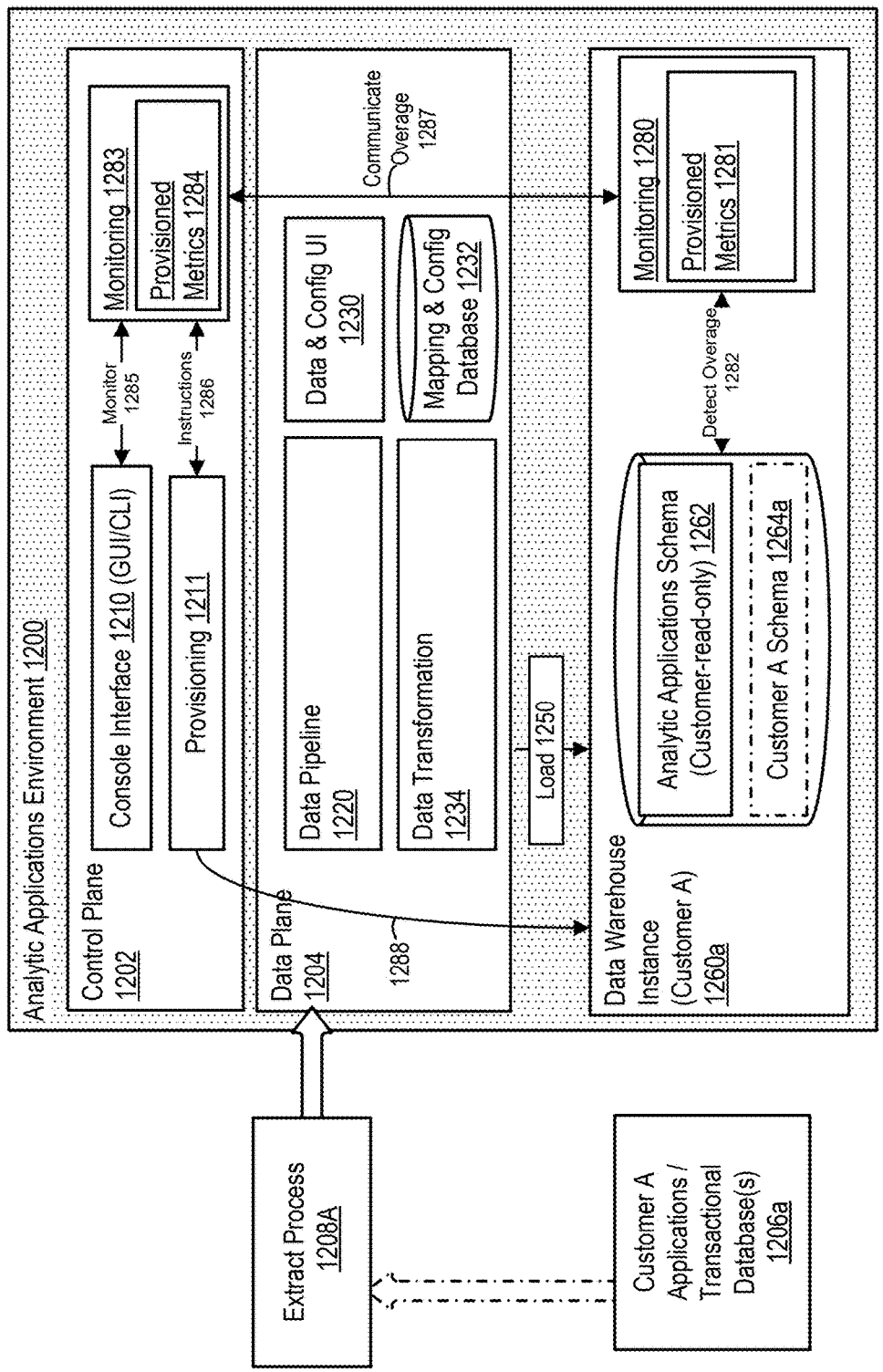
FIG. 12 illustrates a system for SaaS/PaaS resource usage and allocation in an analytic applications environment, in accordance with an embodiment.

FIG. 12 illustrates a system for SaaS/PaaS Resource Usage and allocation in an analytic applications environment, in accordance with an embodiment.

More specifically, FIG. 12 illustrates a system for SaaS/PaaS resource usage and allocation in a situation where storage/data warehouse resources are insufficient, in accordance with an embodiment.

As illustrated in FIG. 12, a control plane 1202 provides control, e.g., for cloud products offered within a SaaS environment; and can include a console interface 1210, that enables access by a client (computer) device under control of a customer/tenant; and a provisioning component 1211.

In accordance with an embodiment, for example, a customer can request a provisioning of a data warehouse instance. The provisioning component can then provision the requested data warehouse instance (including a customer schema); and populate the warehouse with the necessary information supplied by the customer. This can represent, for example, part of a PaaS component.

In accordance with an embodiment, for example, said provisioning additionally be used to, based upon, for example, a purchase order, provision a number of seats, as well number of compute units available to said provisioning customer. This can represent, for example, part of a SaaS component.

In accordance with an embodiment, each such provisioned resource, including database instances, seats, compute units . . . etc., can be tagged for each respective tenant (or sub-tenant) of the system.

As further illustrated in FIG. 12, a data plane 1204 can include a data pipeline (e.g., an extract, transform, load (ETL) process) 1220 and a data transformation layer 1234, which together operate to extract 1208*a*, process, and load 1250, operational or transactional data from customer enterprise applications or transaction database environments, e.g., Oracle Fusion Applications environments, into data warehouse instances. The data plane can also include a data and configuration user interface 1230, and a mapping and configuration database 1232.

In accordance with an embodiment, while the embodiment depicted in FIG. 12 only shows one tenant, customer A represented by 1206*a*, as described above, such systems and methods can support a plurality of tenants. Said depiction of just one tenant is for the sake of clarity in the drawing.

In accordance with an embodiment, the data pipeline maintains, for each customer/tenant (e.g., customers A associated with customer A applications/transactional database 1206*a*), an analytic applications schema 1262, e.g., as a star schema, that is periodically updated (e.g., hourly/daily/weekly) by the system in accordance with best practices for a particular analytic use case, e.g., human capital management (HCM) analytics, or enterprise resource planning (ERP) analytics.

In accordance with an embodiment, the data transformation layer can include a data model (e.g., a knowledge model, KM, or other type of data model) that the system uses to transform the transactional data received from the enterprise or business application, into a model format, for loading into the data warehouse.

In accordance with an embodiment, for each customer, the system uses the analytic applications schema, that is maintained and updated by the system, to pre-populate a data warehouse instance for the customer, based on an analysis of the data within that customer's enterprise applications environment, e.g., 1206a.

In accordance with an embodiment, as such, the analytic applications schema maintained by the system enables data to be retrieved, by the data pipeline, from the customer's environment, and loaded to the customer's data warehouse instance 1260a, in a "live" manner; but is otherwise made accessible to customers in a read-only manner, and is not directly modifiable by the customer.

In accordance with an embodiment, the analytic applications environment also provides, for each customer of the environment, a customer schema, such as 1264a, that is readily modifiable by the customer, and which allows the customer to supplement and utilize the data within their own data warehouse instance.

In accordance with an embodiment, for each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics In accordance with an embodiment, for example, a data warehouse (e.g., an Oracle Autonomous Data Warehouse, ADWC) can include a default analytic applications schema (analytic warehouse schema) and, for each customer/tenant, a customer schema sourced from their enterprise applications component. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline can insert the extracted data into a data staging area for the tenant, which can act as a temporary staging area for the extracted data. A data quality component and data protection component can be used to ensure the integrity of the extracted data; for example, by performing validations on the extracted data while the data is temporarily held in the data staging area.

When the extract process has completed its extraction, the data transformation layer can be used to begin the transformation process, to transform the extracted data into a model format to be loaded into the customer schema of the data warehouse Using the provisioning component, a customer can request the provisioning of a customer schema 1264 within the data warehouse. The customer can also supply, via the console interface, a number of attributes associated with the data warehouse, including required attributes (e.g., login credentials), and optional attributes (e.g., size, speed, number of seats). The provisioning component can then provision the requested data warehouse (e.g., customer schema of the data warehouse), and populate the warehouse with the necessary information supplied by the customer.

Such provisioning can be based upon, for example, a purchase order, including a number of seats, as well as a database size and a number of compute units. Such provisioned components can be tagged to each tenant of a system.

In accordance with an embodiment, a monitoring agent 1280 can be provided in association with the data warehouse instance 1260a (e.g., at the data warehouse, or at the control plane). Such a monitoring agent 1283 can additionally be provided at the control plane. (In accordance with an embodiment, while shown within the Figure as two separate components, monitoring agent 1280 and 1283 can be considered to be a single entity, where the communication line between 1280 and 1283 illustrate the nature of the SaaS/PaaS relationship).

In accordance with an embodiment, the monitoring agent(s) can have access to the provisioned metrics associated with the tenant/customer. The monitoring agent 1280/1283 can be responsible for monitoring 1282/1285 (e.g., dynamically, at set, configurable intervals, hourly, daily, etc.) the use of resources by the tenant/customer at the data warehouse (e.g., monitoring storage used by a customer/tenant at the associated data warehouse instance) and/or at the control plane (e.g., monitoring usage of compute units by a customer/tenant for use in analytics) by, for example, monitoring resources tagged by each tenant of the system. This can include, for example, monitoring and metering the customer's use of compute units in relation to the provisioned metrics, or metering the number of seats in use by a customer in relation to the provisioned metrics.

In accordance with an embodiment, the monitoring agent can use the provisioned metrics 1281/1284 (e.g., those resources provisioned or allocated to a customer/tenant in response to a provisioning by the customer/tenant) in monitoring and tracking the resource utilization by a tenant, which can provide for improved resource allocation within the systems. That is, as each tenant has the various resources provisioned to it tagged as being associated with each tenant, the monitoring agent can, via tracking the tagged (where each resourced allocated to a tenant is tagged so as to identify it as belonging to, or being allocated to, said tenant) resources, determine the resource usage for each tenant. In addition, the monitoring agent can provided a notification/instructions 1286 to the provisioning component 1211, or other back end systems, that a tenant has exceeded its provisioned resources, or that a given tenant should be provided with additional resources (e.g., compute units) for a set amount of time, given the monitored metrics associated with a tenant. Likewise, the monitoring agent 1280/1283 can provide instructions 1288 that a customer/tenant has been allocated too many resources (beyond those provisioned), which are not being utilized. In such cases, then, the provisioning component can reclaim such resources in order to, e.g., save utilization and/or provision such resources to a different tenant/customer.

In accordance with an embodiment, as depicted in the embodiment of FIG. 12, monitoring agent 1280 can detect 1282 that a customer/tenant's data warehouse instance is providing insufficient resources to the associated customer/tenant. This can be, for example, during a period of on-boarding a large amount of data where a current size of the provisioned data warehouse instance is insufficient for the on-boarding (ETL process) of new data. In such an embodiment, then, the monitoring agent can communicate the overage 1287, and instructions 1286 can be relayed to the provisioning component 1211 to allocate/provision 1288 additional resources (in the illustrated example, additional storage space) to the customer instance of the data warehouse in order to meet the current demands of the client seamlessly and without administrative action.

Figure 13:
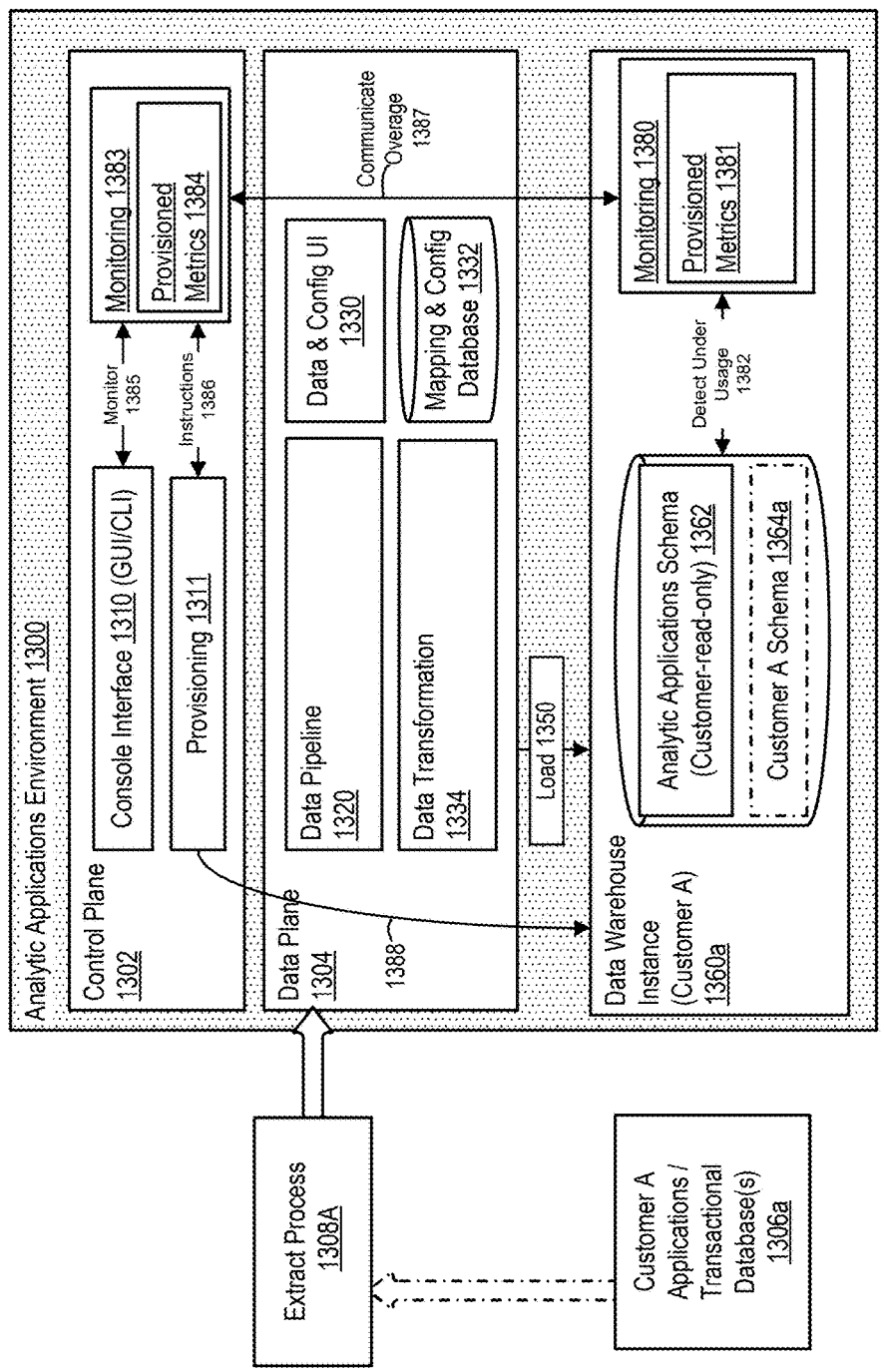
FIG. 13 illustrates a system for SaaS/PaaS resource usage and allocation in an analytic applications environment, in accordance with an embodiment.

FIG. 13 illustrates a system for SaaS/PaaS resource usage and allocation in an analytic applications environment, in accordance with an embodiment.

More specifically, FIG. 13 illustrates a system for SaaS/PaaS resource usage and allocation in a situation where storage/data warehouse resources are being underutilized by a tenant/customer, in accordance with an embodiment.

As illustrated in FIG. 13, a control plane 1302 provides control, e.g., for cloud products offered within a SaaS environment; and can include a console interface 1310, that enables access by a client (computer) device under control of a customer/tenant; and a provisioning component 1311.

In accordance with an embodiment, for example, a customer can request a provisioning of a data warehouse instance. The provisioning component can then provision the requested data warehouse instance (including a customer schema); and populate the warehouse with the necessary information supplied by the customer. This can represent, for example, part of a PaaS component.

In accordance with an embodiment, for example, said provisioning additionally be used to, based upon, for example, a purchase order, provision a number of seats, as well number of compute units available to said provisioning customer. This can represent, for example, part of a SaaS component.

In accordance with an embodiment, each such provisioned resource, including database instances, seats, compute units . . . etc., can be tagged for each respective tenant (or sub-tenant) of the system.

As further illustrated in FIG. 13, a data plane 1304 can include a data pipeline (e.g., an extract, transform, load (ETL) process) 1320 and a data transformation layer 1334, which together operate to extract 1308a, process, and load 1350, operational or transactional data from customer enterprise applications or transaction database environments, e.g., Oracle Fusion Applications environments, into data warehouse instances. The data plane can also include a data and configuration user interface 1330, and a mapping and configuration database 1332.

In accordance with an embodiment, while the embodiment depicted in FIG. 13 only shows one tenant, customer A represented by 1306a, as described above, such systems and methods can support a plurality of tenants. Said depiction of just one tenant is for the sake of clarity in the drawing.

In accordance with an embodiment, the data pipeline maintains, for each customer/tenant (e.g., customers A associated with customer A applications/transactional database 1306a), an analytic applications schema 1362, e.g., as a star schema, that is periodically updated (e.g., hourly/daily/weekly) by the system in accordance with best practices for a particular analytic use case, e.g., human capital management (HCM) analytics, or enterprise resource planning (ERP) analytics.

In accordance with an embodiment, the data transformation layer can include a data model (e.g., a knowledge model, KM, or other type of data model) that the system uses to transform the transactional data received from the enterprise or business application, into a model format, for loading into the data warehouse.

In accordance with an embodiment, for each customer, the system uses the analytic applications schema, that is maintained and updated by the system, to pre-populate a data warehouse instance for the customer, based on an analysis of the data within that customer's enterprise applications environment, e.g., 1306a.

In accordance with an embodiment, as such, the analytic applications schema maintained by the system enables data to be retrieved, by the data pipeline, from the customer's environment, and loaded to the customer's data warehouse instance 1360a, in a "live" manner; but is otherwise made accessible to customers in a read-only manner, and is not directly modifiable by the customer.

In accordance with an embodiment, the analytic applications environment also provides, for each customer of the environment, a customer schema, such as 1364a, that is readily modifiable by the customer, and which allows the customer to supplement and utilize the data within their own data warehouse instance.

In accordance with an embodiment, for each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics In accordance with an embodiment, for example, a data warehouse (e.g., an Oracle Autonomous Data Warehouse, ADWC) can include a default analytic applications schema (analytic warehouse schema) and, for each customer/tenant, a customer schema sourced from their enterprise applications component. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline can insert the extracted data into a data staging area for the tenant, which can act as a temporary staging area for the extracted data. A data quality component and data protection component can be used to ensure the integrity of the extracted data; for example, by performing validations on the extracted data while the data is temporarily held in the data staging area.

When the extract process has completed its extraction, the data transformation layer can be used to begin the transformation process, to transform the extracted data into a model format to be loaded into the customer schema of the data warehouse Using the provisioning component, a customer can request the provisioning of a customer schema 1364 within the data warehouse. The customer can also supply, via the console interface, a number of attributes associated with the data warehouse, including required attributes (e.g., login credentials), and optional attributes (e.g., size, speed, number of seats). The provisioning component can then provision the requested data warehouse (e.g., customer schema of the data warehouse), and populate the warehouse with the necessary information supplied by the customer.

Such provisioning can be based upon, for example, a purchase order, including a number of seats, as well as a database size and a number of compute units. Such provisioned components can be tagged to each tenant of a system.

In accordance with an embodiment, a monitoring agent 1380 can be provided in association with the data warehouse instance 1360a (e.g., at the data warehouse, or at the control plane). Such a monitoring agent 1383 can additionally be provided at the control plane. (In accordance with an embodiment, while shown within the Figure as two separate components, monitoring agent 1380 and 1383 can be considered to be a single entity, where the communication line between 1380 and 1383 illustrate the nature of the SaaS/PaaS relationship).

In accordance with an embodiment, the monitoring agent(s) can have access to the provisioned metrics associated with the tenant/customer. The monitoring agent 1380 1383 can be responsible for monitoring 1382/1385 (e.g., dynamically, at set, configurable intervals, hourly, daily, etc.) the use of resources by the tenant/customer at the data warehouse (e.g., monitoring storage used by a customer/tenant at the associated data warehouse instance) and/or at the control plane (e.g., monitoring usage of compute units by a customer/tenant for use in analytics) by, for example, monitoring resources tagged by each tenant of the system. This can include, for example, monitoring and metering the customer's use of compute units in relation to the provisioned metrics, or metering the number of seats in use by a customer in relation to the provisioned metrics.

In accordance with an embodiment, the monitoring agent can use the provisioned metrics 1381/1384 (e.g., those resources provisioned or allocated to a customer/tenant in response to a provisioning by the customer/tenant) in monitoring and tracking the resource utilization by a tenant, which can provide for improved resource allocation within the systems. That is, as each tenant has the various resources provisioned to it tagged as being associated with each tenant, the monitoring agent can, via tracking the tagged (where each resourced allocated to a tenant is tagged so as to identify it as belonging to, or being allocated to, said tenant) resources, determine the resource usage for each tenant. In addition, the monitoring agent can provided a notification/instructions 1386 to the provisioning component 1311, or other back end systems, that a tenant has exceeded its provisioned resources, or that a given tenant should be provided with additional resources (e.g., compute units) for a set amount of time, given the monitored metrics associated with a tenant. Likewise, the monitoring agent 1380/1383 can provide instructions 1388 that a customer/tenant has been allocated too many resources (beyond those provisioned), which are not being utilized. In such cases, then, the provisioning component can reclaim such resources in order to, e.g., save utilization and/or provision such resources to a different tenant/customer.

In accordance with an embodiment, as depicted in the embodiment of FIG. 13, monitoring agent 1380 can detect 1382 that a customer/tenant's data warehouse instance is providing more than sufficient resources such that the utilization of the resources provided to the customer/tenant are greater than the current demand. This can be, for example, during regular operation a tenant/customer has too much storage space allocated to its instance of the data warehouse (e.g., 1364a). In such an embodiment, then, the monitoring agent can communicate the underutilization 1387, and instructions 1386 can be relayed to the provisioning component 1311. Then, in accordance with some embodiments, the provisioning component can de-allocate resources (e.g., storage size) to the customer/tenant and re-allocate elsewhere, or hold in reserve in order to reallocate to the customer/tenant on such resources being needed again in order to meet the current demands of the client seamlessly and without administrative action.

Figure 14:
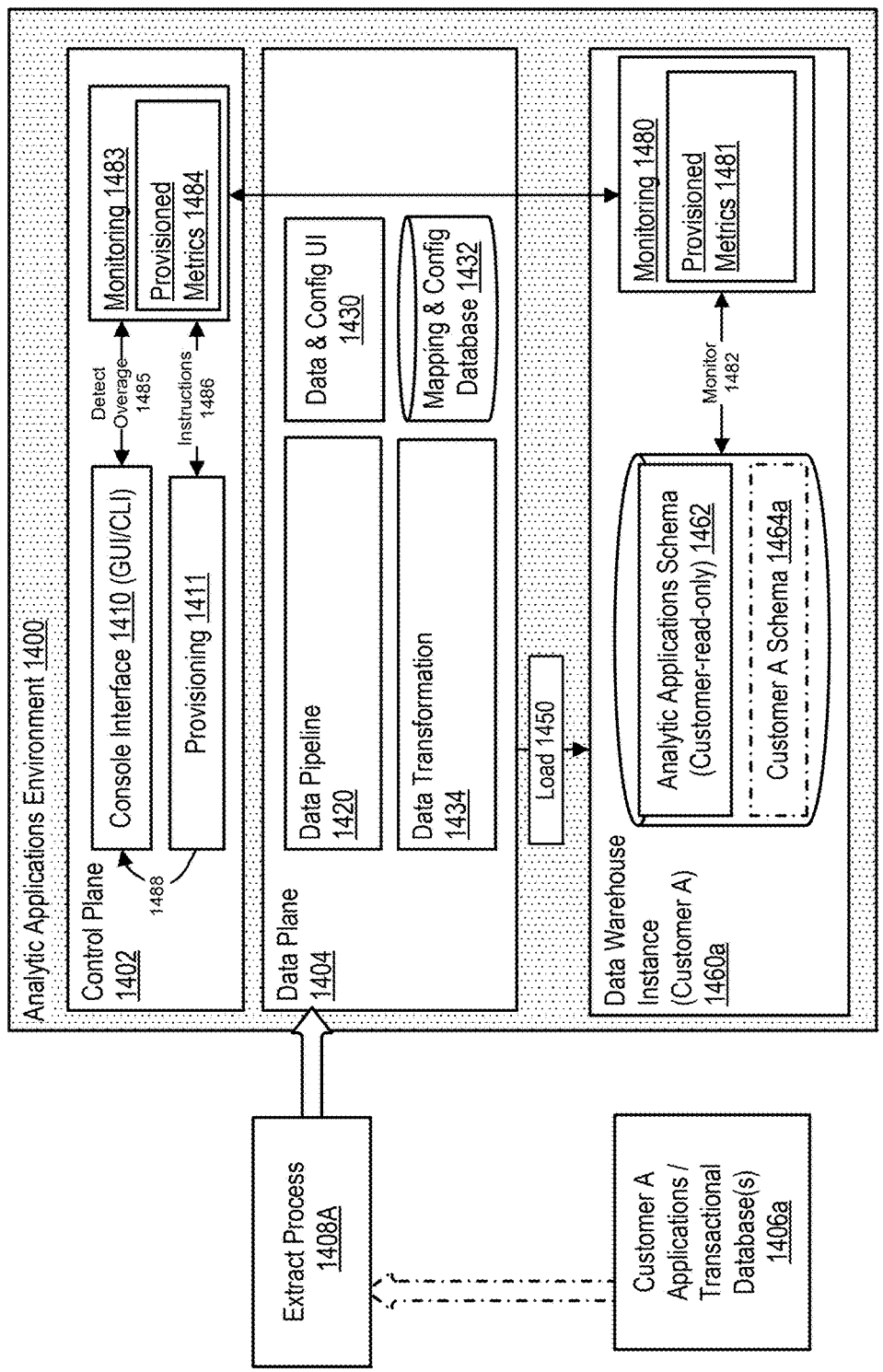
FIG. 14 illustrates a system for SaaS/PaaS resource usage and allocation in an analytic applications environment, in accordance with an embodiment.

FIG. 14 illustrates a system for SaaS/PaaS resource usage and allocation in an analytic applications environment, in accordance with an embodiment.

More specifically, FIG. 14 illustrates a system for SaaS/PaaS resource usage and allocation in a situation where storage/data warehouse resources are being underutilized by a tenant/customer, in accordance with an embodiment.

As illustrated in FIG. 14, a control plane 1402 provides control, e.g., for cloud products offered within a SaaS environment; and can include a console interface 1410, that enables access by a client (computer) device under control of a customer/tenant; and a provisioning component 1411.

In accordance with an embodiment, for example, a customer can request a provisioning of a data warehouse instance. The provisioning component can then provision the requested data warehouse instance (including a customer schema); and populate the warehouse with the necessary information supplied by the customer. This can represent, for example, part of a PaaS component.

In accordance with an embodiment, for example, said provisioning additionally be used to, based upon, for example, a purchase order, provision a number of seats, as well number of compute units available to said provisioning customer. This can represent, for example, part of a SaaS component.

In accordance with an embodiment, each such provisioned resource, including database instances, seats, compute units . . . etc., can be tagged for each respective tenant (or sub-tenant) of the system.

As further illustrated in FIG. 14, a data plane 1404 can include a data pipeline (e.g., an extract, transform, load (ETL) process) 1420 and a data transformation layer 1434, which together operate to extract 1408a, process, and load 1450, operational or transactional data from customer enterprise applications or transaction database environments, e.g., Oracle Fusion Applications environments, into data warehouse instances. The data plane can also include a data and configuration user interface 1430, and a mapping and configuration database 1432.

In accordance with an embodiment, while the embodiment depicted in FIG. 14 only shows one tenant, customer A represented by 1406a, as described above, such systems and methods can support a plurality of tenants. Said depiction of just one tenant is for the sake of clarity in the drawing.

In accordance with an embodiment, the data pipeline maintains, for each customer/tenant (e.g., customers A associated with customer A applications/transactional database 1406a), an analytic applications schema 1462, e.g., as a star schema, that is periodically updated (e.g., hourly/daily/weekly) by the system in accordance with best practices for a particular analytic use case, e.g., human capital management (HCM) analytics, or enterprise resource planning (ERP) analytics.

In accordance with an embodiment, the data transformation layer can include a data model (e.g., a knowledge model, KM, or other type of data model) that the system uses to transform the transactional data received from the enterprise or business application, into a model format, for loading into the data warehouse.

In accordance with an embodiment, for each customer, the system uses the analytic applications schema, that is maintained and updated by the system, to pre-populate a data warehouse instance for the customer, based on an analysis of the data within that customer's enterprise applications environment, e.g., 1406a.

In accordance with an embodiment, as such, the analytic applications schema maintained by the system enables data to be retrieved, by the data pipeline, from the customer's environment, and loaded to the customer's data warehouse instance 1460a, in a "live" manner; but is otherwise made accessible to customers in a read-only manner, and is not directly modifiable by the customer.

In accordance with an embodiment, the analytic applications environment also provides, for each customer of the environment, a customer schema, such as 1464a, that is readily modifiable by the customer, and which allows the customer to supplement and utilize the data within their own data warehouse instance.

In accordance with an embodiment, for each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics In accordance with an embodiment, for example, a data warehouse (e.g., an Oracle Autonomous Data Warehouse, ADWC) can include a default analytic applications schema (analytic warehouse schema) and, for each customer/tenant, a customer schema sourced from their enterprise applications component. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline can insert the extracted data into a data staging area for the tenant, which can act as a temporary staging area for the extracted data. A data quality component and data protection component can be used to ensure the integrity of the extracted data; for example, by performing validations on the extracted data while the data is temporarily held in the data staging area.

When the extract process has completed its extraction, the data transformation layer can be used to begin the transformation process, to transform the extracted data into a model format to be loaded into the customer schema of the data warehouse Using the provisioning component, a customer can request the provisioning of a customer schema 1464 within the data warehouse. The customer can also supply, via the console interface, a number of attributes associated with the data warehouse, including required attributes (e.g., login credentials), and optional attributes (e.g., size, speed, number of seats). The provisioning component can then provision the requested data warehouse (e.g., customer schema of the data warehouse), and populate the warehouse with the necessary information supplied by the customer.

Such provisioning can be based upon, for example, a purchase order, including a number of seats, as well as a database size and a number of compute units. Such provisioned components can be tagged to each tenant of a system.

In accordance with an embodiment, a monitoring agent 1480 can be provided in association with the data warehouse instance 1460a (e.g., at the data warehouse, or at the control plane). Such a monitoring agent 1483 can additionally be provided at the control plane. (In accordance with an embodiment, while shown within the Figure as two separate components, monitoring agent 1480 and 1483 can be considered to be a single entity, where the communication line between 1480 and 1483 illustrate the nature of the SaaS/PaaS relationship).

In accordance with an embodiment, the monitoring agent(s) can have access to the provisioned metrics associated with the tenant/customer. The monitoring agent 1480 1483 can be responsible for monitoring 1482/1485 (e.g., dynamically, at set, configurable intervals, hourly, daily, etc.) the use of resources by the tenant/customer at the data warehouse (e.g., monitoring storage used by a customer/tenant at the associated data warehouse instance) and/or at the control plane (e.g., monitoring usage of compute units by a customer/tenant for use in analytics) by, for example, monitoring resources tagged by each tenant of the system. This can include, for example, monitoring and metering the customer's use of compute units in relation to the provisioned metrics, or metering the number of seats in use by a customer in relation to the provisioned metrics.

In accordance with an embodiment, the monitoring agent can use the provisioned metrics 1481/1484 (e.g., those resources provisioned or allocated to a customer/tenant in response to a provisioning by the customer/tenant) in monitoring and tracking the resource utilization by a tenant, which can provide for improved resource allocation within the systems. That is, as each tenant has the various resources provisioned to it tagged as being associated with each tenant, the monitoring agent can, via tracking the tagged (where each resourced allocated to a tenant is tagged so as to identify it as belonging to, or being allocated to, said tenant) resources, determine the resource usage for each tenant. In addition, the monitoring agent can provided a notification/instructions 1486 to the provisioning component 1411, or other back end systems, that a tenant has exceeded its provisioned resources, or that a given tenant should be provided with additional resources (e.g., compute units) for a set amount of time, given the monitored metrics associated with a tenant. Likewise, the monitoring agent 1480/1483 can provide instructions 1488 that a customer/tenant has been allocated too many resources (beyond those provisioned), which are not being utilized. In such cases, then, the provisioning component can reclaim such resources in order to, e.g., save utilization and/or provision such resources to a different tenant/customer.

In accordance with an embodiment, as depicted in the embodiment of FIG. 14, monitoring agent 1483 can detect 1485 that the resources provisioned to the customer/tenant at the console interface (e.g., compute units, seats . . . etc.) are being fully utilized, and that the customer/tenant requires an overage of such resources. This can be, for example, when a customer/tenant is running intensive analytics on a large scale, for example, running analytics on several hundred gigabytes of data requiring more compute units than were initially provisioned to the customer/tenant. (e.g., 1464a). In such an embodiment, instructions 1486 can be relayed to the provisioning component 1411. Then, in accordance with some embodiments, the provisioning component can allocate additional compute resources (or seats) to the customer/tenant in order to meet the current demands of the client seamlessly and without administrative action.

Figure 15:
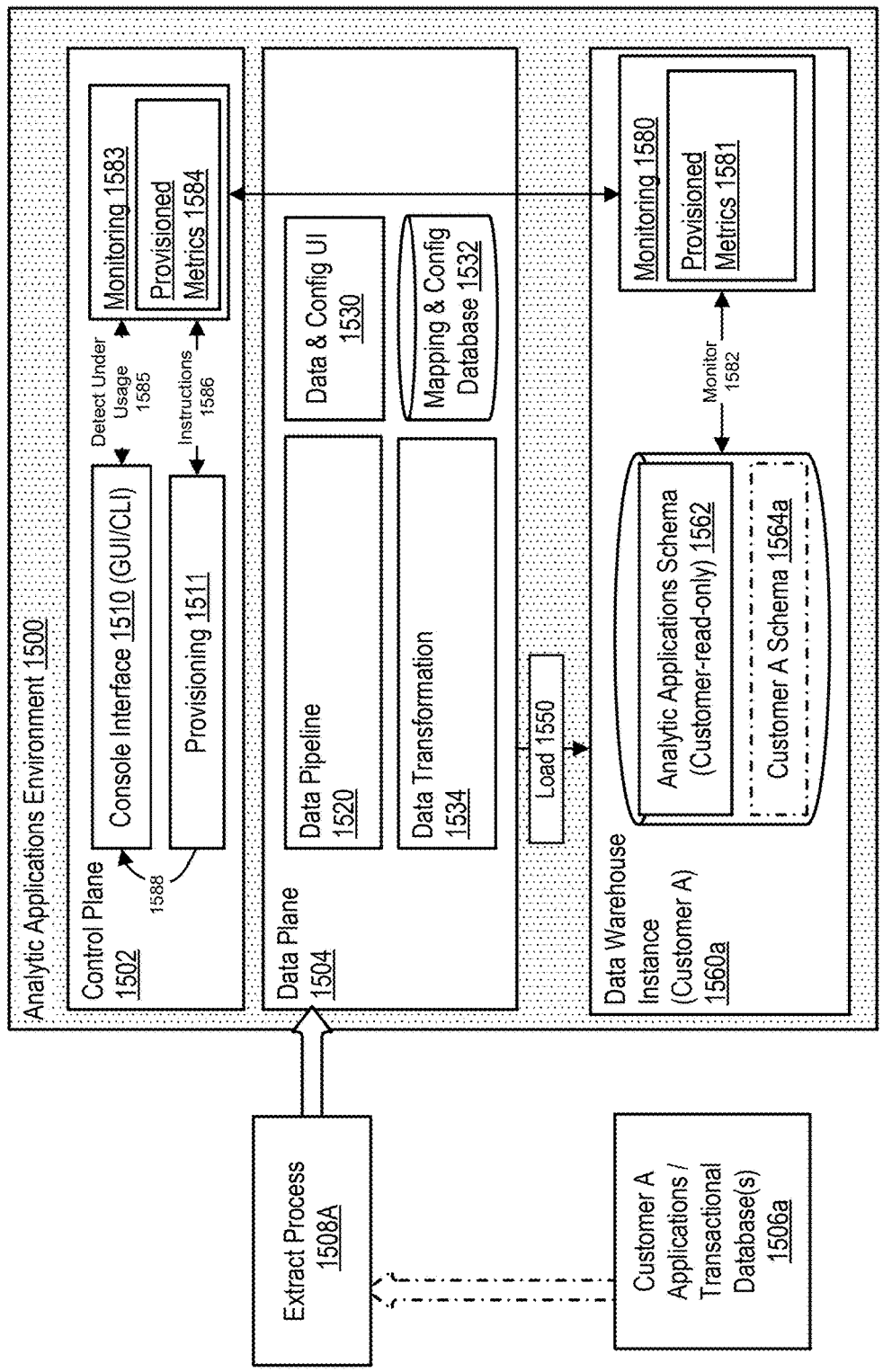
FIG. 15 illustrates a system for SaaS/PaaS resource usage and allocation in an analytic applications environment, in accordance with an embodiment.

FIG. 15 illustrates a system for SaaS/PaaS resource usage and allocation in an analytic applications environment, in accordance with an embodiment.

More specifically, FIG. 15 illustrates a system for SaaS/PaaS resource usage and allocation in a situation where storage/data warehouse resources are being underutilized by a tenant/customer, in accordance with an embodiment.

As illustrated in FIG. 15, a control plane 1502 provides control, e.g., for cloud products offered within a SaaS environment; and can include a console interface 1510, that enables access by a client (computer) device under control of a customer/tenant; and a provisioning component 1511.

In accordance with an embodiment, for example, a customer can request a provisioning of a data warehouse instance. The provisioning component can then provision the requested data warehouse instance (including a customer schema); and populate the warehouse with the necessary information supplied by the customer. This can represent, for example, part of a PaaS component.

In accordance with an embodiment, for example, said provisioning additionally be used to, based upon, for example, a purchase order, provision a number of seats, as well number of compute units available to said provisioning customer. This can represent, for example, part of a SaaS component.

In accordance with an embodiment, each such provisioned resource, including database instances, seats, compute units . . . etc., can be tagged for each respective tenant (or sub-tenant) of the system.

As further illustrated in FIG. 15, a data plane 1504 can include a data pipeline (e.g., an extract, transform, load (ETL) process) 1520 and a data transformation layer 1534, which together operate to extract 1508a, process, and load 1550, operational or transactional data from customer enterprise applications or transaction database environments, e.g., Oracle Fusion Applications environments, into data warehouse instances. The data plane can also include a data and configuration user interface 1530, and a mapping and configuration database 1532.

In accordance with an embodiment, while the embodiment depicted in FIG. 15 only shows one tenant, customer A represented by 1506a, as described above, such systems and methods can support a plurality of tenants. Said depiction of just one tenant is for the sake of clarity in the drawing.

In accordance with an embodiment, the data pipeline maintains, for each customer/tenant (e.g., customers A associated with customer A applications/transactional database 1506a), an analytic applications schema 1562, e.g., as a star schema, that is periodically updated (e.g., hourly/daily/weekly) by the system in accordance with best practices for a particular analytic use case, e.g., human capital management (HCM) analytics, or enterprise resource planning (ERP) analytics.

In accordance with an embodiment, the data transformation layer can include a data model (e.g., a knowledge model, KM, or other type of data model) that the system uses to transform the transactional data received from the enterprise or business application, into a model format, for loading into the data warehouse.

In accordance with an embodiment, for each customer, the system uses the analytic applications schema, that is maintained and updated by the system, to pre-populate a data warehouse instance for the customer, based on an analysis of the data within that customer's enterprise applications environment, e.g., 1506a.

In accordance with an embodiment, as such, the analytic applications schema maintained by the system enables data to be retrieved, by the data pipeline, from the customer's environment, and loaded to the customer's data warehouse instance 1560a, in a "live" manner; but is otherwise made accessible to customers in a read-only manner, and is not directly modifiable by the customer.

In accordance with an embodiment, the analytic applications environment also provides, for each customer of the environment, a customer schema, such as 1564a, that is readily modifiable by the customer, and which allows the customer to supplement and utilize the data within their own data warehouse instance.

In accordance with an embodiment, for each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics In accordance with an embodiment, for example, a data warehouse (e.g., an Oracle Autonomous Data Warehouse, ADWC) can include a default analytic applications schema (analytic warehouse schema) and, for each customer/tenant, a customer schema sourced from their enterprise applications component. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline can insert the extracted data into a data staging area for the tenant, which can act as a temporary staging area for the extracted data. A data quality component and data protection component can be used to ensure the integrity of the extracted data; for example, by performing validations on the extracted data while the data is temporarily held in the data staging area.

When the extract process has completed its extraction, the data transformation layer can be used to begin the transformation process, to transform the extracted data into a model format to be loaded into the customer schema of the data warehouse Using the provisioning component, a customer can request the provisioning of a customer schema 1564 within the data warehouse. The customer can also supply, via the console interface, a number of attributes associated with the data warehouse, including required attributes (e.g., login credentials), and optional attributes (e.g., size, speed, number of seats). The provisioning component can then provision the requested data warehouse (e.g., customer schema of the data warehouse), and populate the warehouse with the necessary information supplied by the customer.

Such provisioning can be based upon, for example, a purchase order, including a number of seats, as well as a database size and a number of compute units. Such provisioned components can be tagged to each tenant of a system.

In accordance with an embodiment, a monitoring agent 1580 can be provided in association with the data warehouse instance 1560a (e.g., at the data warehouse, or at the control plane). Such a monitoring agent 1583 can additionally be provided at the control plane. (In accordance with an embodiment, while shown within the Figure as two separate components, monitoring agent 1580 and 1583 can be considered to be a single entity, where the communication line between 1580 and 1583 illustrate the nature of the SaaS/PaaS relationship).

In accordance with an embodiment, the monitoring agent(s) can have access to the provisioned metrics associated with the tenant/customer. The monitoring agent 1580 1583 can be responsible for monitoring 1582/1585 (e.g., dynamically, at set, configurable intervals, hourly, daily, etc.) the use of resources by the tenant/customer at the data warehouse (e.g., monitoring storage used by a customer/tenant at the associated data warehouse instance) and/or at the control plane (e.g., monitoring usage of compute units by a customer/tenant for use in analytics) by, for example, monitoring resources tagged by each tenant of the system. This can include, for example, monitoring and metering the customer's use of compute units in relation to the provisioned metrics, or metering the number of seats in use by a customer in relation to the provisioned metrics.

In accordance with an embodiment, the monitoring agent can use the provisioned metrics 1581/1584 (e.g., those resources provisioned or allocated to a customer/tenant in response to a provisioning by the customer/tenant) in monitoring and tracking the resource utilization by a tenant, which can provide for improved resource allocation within the systems. That is, as each tenant has the various resources provisioned to it tagged as being associated with each tenant, the monitoring agent can, via tracking the tagged (where each resourced allocated to a tenant is tagged so as to identify it as belonging to, or being allocated to, said tenant) resources, determine the resource usage for each tenant. In addition, the monitoring agent can provided a notification/instructions 1586 to the provisioning component 1511, or other back end systems, that a tenant has exceeded its provisioned resources, or that a given tenant should be provided with additional resources (e.g., compute units) for a set amount of time, given the monitored metrics associated with a tenant. Likewise, the monitoring agent 1580/1583 can provide instructions 1588 that a customer/tenant has been allocated too many resources (beyond those provisioned), which are not being utilized. In such cases, then, the provisioning component can reclaim such resources in order to, e.g., save utilization and/or provision such resources to a different tenant/customer.

In accordance with an embodiment, as depicted in the embodiment of FIG. 15, monitoring agent 1583 can detect 1585 that the resources provisioned to the customer/tenant at the console interface (e.g., compute units, seats . . . etc.) are being underutilized, and that the customer/tenant does not currently require the amount or resources provisioned. This can be, for example, when a customer/tenant is not currently running any analytics. Then, in accordance with some embodiments, the provisioning component can de-allocate resources (e.g., number of compute units) to the customer/tenant and re-allocate elsewhere, or hold in reserve in order to reallocate to the customer/tenant on such resources being needed again in order to meet the current demands of the client seamlessly and without administrative action.

Figure 16:
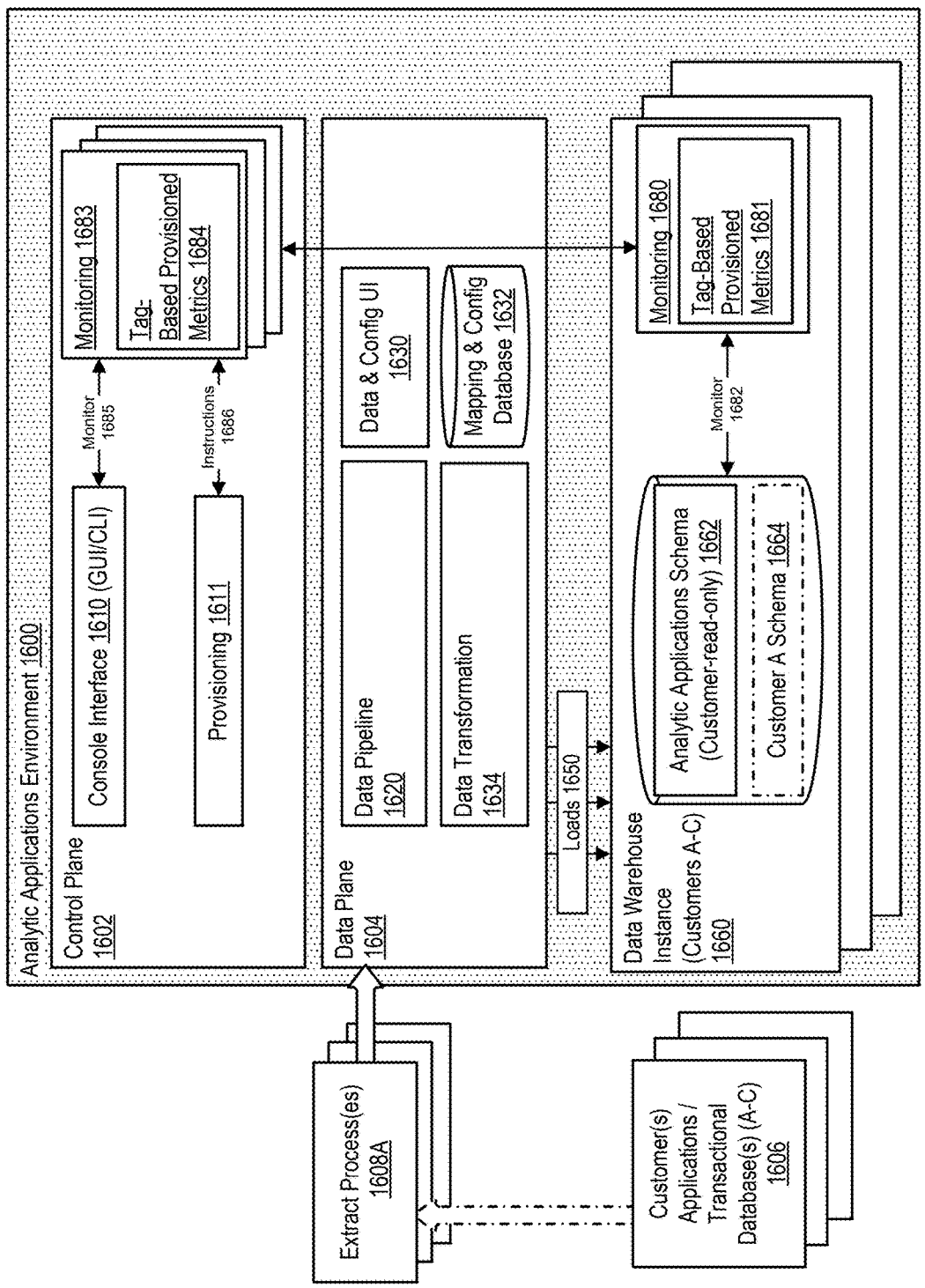
FIG. 16 illustrates a system for SaaS/PaaS resource usage and allocation in an analytic applications environment, in accordance with an embodiment.

FIG. 16 illustrates a system for SaaS/PaaS resource usage and allocation in an analytic applications environment, in accordance with an embodiment.

More specifically, FIG. 16 illustrates a system for SaaS/PaaS resource usage and allocation in an analytic applications environment supporting multiple customers/tenants.

As illustrated in FIG. 16, a control plane 1602 provides control, e.g., for cloud products offered within a SaaS environment; and can include a console interface 1610, that enables access by a client (computer) device under control of a customer/tenant; and a provisioning component 1611.

In accordance with an embodiment, for example, a customer can request a provisioning of a data warehouse instance. The provisioning component can then provision the requested data warehouse instance (including a customer schema); and populate the warehouse with the necessary information supplied by the customer. This can represent, for example, part of a PaaS component.

In accordance with an embodiment, for example, said provisioning additionally be used to, based upon, for example, a purchase order, provision a number of seats, as well number of compute units available to said provisioning customer. This can represent, for example, part of a SaaS component.

In accordance with an embodiment, each such provisioned resource, including database instances, seats, compute units . . . etc., can be tagged for each respective tenant (or sub-tenant) of the system.

As further illustrated in FIG. 16, a data plane 1604 can include a data pipeline (e.g., an extract, transform, load (ETL) process) 1620 and a data transformation layer 1634, which together operate to extract 1608 (where each extract process is separate for each tenant/customer and/or application or transactional database associated therewith), process, and load 1650, operational or transactional data from customer enterprise applications or transaction database environments, e.g., Oracle Fusion Applications environments, into data warehouse instances. The data plane can also include a data and configuration user interface 1630, and a mapping and configuration database 1632.

In accordance with an embodiment, system for SaaS/PaaS resource usage and allocation in an analytic applications environment can support multiple tenants/customers, each sharing the analytic applications environment 1600 via multiple instances of the data warehouse F60. As shown in the Figure, customers/tenants, each associated with a separate application/transactional database 1606, can be supported.

In accordance with an embodiment, the data pipeline maintains, for each customer/tenant (e.g., customers A-C associated with customer A-C applications/transactional database 1606), an analytic applications schema 1662, e.g., as a star schema, that is periodically updated (e.g., hourly/daily/weekly) by the system in accordance with best practices for a particular analytic use case, e.g., human capital management (HCM) analytics, or enterprise resource planning (ERP) analytics.

In accordance with an embodiment, the data transformation layer can include a data model (e.g., a knowledge model, KM, or other type of data model) that the system uses to transform the transactional data received from the enterprise or business application, into a model format, for loading into the data warehouse.

In accordance with an embodiment, for each customer, the system uses the analytic applications schema, that is maintained and updated by the system, to pre-populate a data warehouse instance for the customer, based on an analysis of the data within that customer's enterprise applications environment, e.g., 1606*a*.

In accordance with an embodiment, as such, the analytic applications schema maintained by the system enables data to be retrieved, by the data pipeline, from the customer's environment, and loaded to the customer's data warehouse instance 1660, in a "live" manner; but is otherwise made accessible to customers in a read-only manner, and is not directly modifiable by the customer.

In accordance with an embodiment, the analytic applications environment also provides, for each customer of the environment, a customer schema, such as 1664, that is readily modifiable by the customer, and which allows the customer to supplement and utilize the data within their own data warehouse instance.

In accordance with an embodiment, for each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics In accordance with an embodiment, for example, a data warehouse (e.g., an Oracle Autonomous Data Warehouse, ADWC) can include a default analytic applications schema (analytic warehouse schema) and, for each customer/tenant, a customer schema sourced from their enterprise applications component. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline can insert the extracted data into a data staging area for the tenant, which can act as a temporary staging area for the extracted data. A data quality component and data protection component can be used to ensure the integrity of the extracted data; for example, by performing validations on the extracted data while the data is temporarily held in the data staging area.

When the extract process has completed its extraction, the data transformation layer can be used to begin the transformation process, to transform the extracted data into a model format to be loaded into the customer schema of the data warehouse Using the provisioning component, a customer can request the provisioning of a customer schema 1664 within the data warehouse. The customer can also supply, via the console interface, a number of attributes associated with the data warehouse, including required attributes (e.g., login credentials), and optional attributes (e.g., size, speed, number of seats). The provisioning component can then provision the requested data warehouse (e.g., customer schema of the data warehouse), and populate the warehouse with the necessary information supplied by the customer.

Such provisioning can be based upon, for example, a purchase order, including a number of seats, as well as a database size and a number of compute units. Such provisioned components can be tagged to each tenant of a system.

In accordance with an embodiment, a monitoring agent 1680 can be provided in association with each data warehouse instance 1660 (e.g., at the data warehouse, or at the control plane). In addition, monitoring agents 1683 can be provided at the control plane, each in associated with a customer/tenant instance. (In accordance with an embodiment, while shown within the Figure as two separate components, each instance of monitoring agents 1680 and 1683 can be considered to be a single entity, where the communication line between 1680 and 1683 illustrate the nature of the SaaS/PaaS relationship).

In accordance with an embodiment, the monitoring agent(s) can have access to the provisioned metrics associated with the tenant/customer to which the monitoring agents are associated (e.g., based upon the tags of the metrics which are monitored). The monitoring agent 1680 1683 can be responsible for monitoring 1682/1685 (e.g., dynamically, at set, configurable intervals, hourly, daily, etc.) the use of resources by the tenant/customer at the data warehouse (e.g., monitoring storage used by a customer/tenant at the associated data warehouse instance) and/or at the control plane (e.g., monitoring usage of compute units by a customer/tenant for use in analytics) by, for example, monitoring resources tagged by each tenant of the system. This can include, for example, monitoring and metering the customer's use of compute units in relation to the provisioned metrics, or metering the number of seats in use by a customer in relation to the provisioned metrics.

In accordance with an embodiment, the monitoring agent can use the provisioned metrics 1681/1684 (e.g., those resources provisioned or allocated to a customer/tenant in response to a provisioning by the customer/tenant) in monitoring and tracking the resource utilization by a tenant, which can provide for improved resource allocation within the systems. That is, as each tenant has the various resources provisioned to it tagged as being associated with each tenant, the monitoring agent can, via tracking the tagged (where each resourced allocated to a tenant is tagged so as to identify it as belonging to, or being allocated to, said tenant) resources, determine the resource usage for each tenant. In addition, the monitoring agent can provided a notification/instructions 1686 to the provisioning component 1611, or other back end systems, that a tenant has exceeded its provisioned resources, or that a given tenant should be provided with additional resources (e.g., compute units) for a set amount of time, given the monitored metrics associated with a tenant. Likewise, the monitoring agent 1680/1683 can provide instructions 1688 that a customer/tenant has been allocated too many resources (beyond those provisioned), which are not being utilized. In such cases, then, the provisioning component can reclaim such resources in order to, e.g., save utilization and/or provision such resources to a different tenant/customer.

Figure 17:
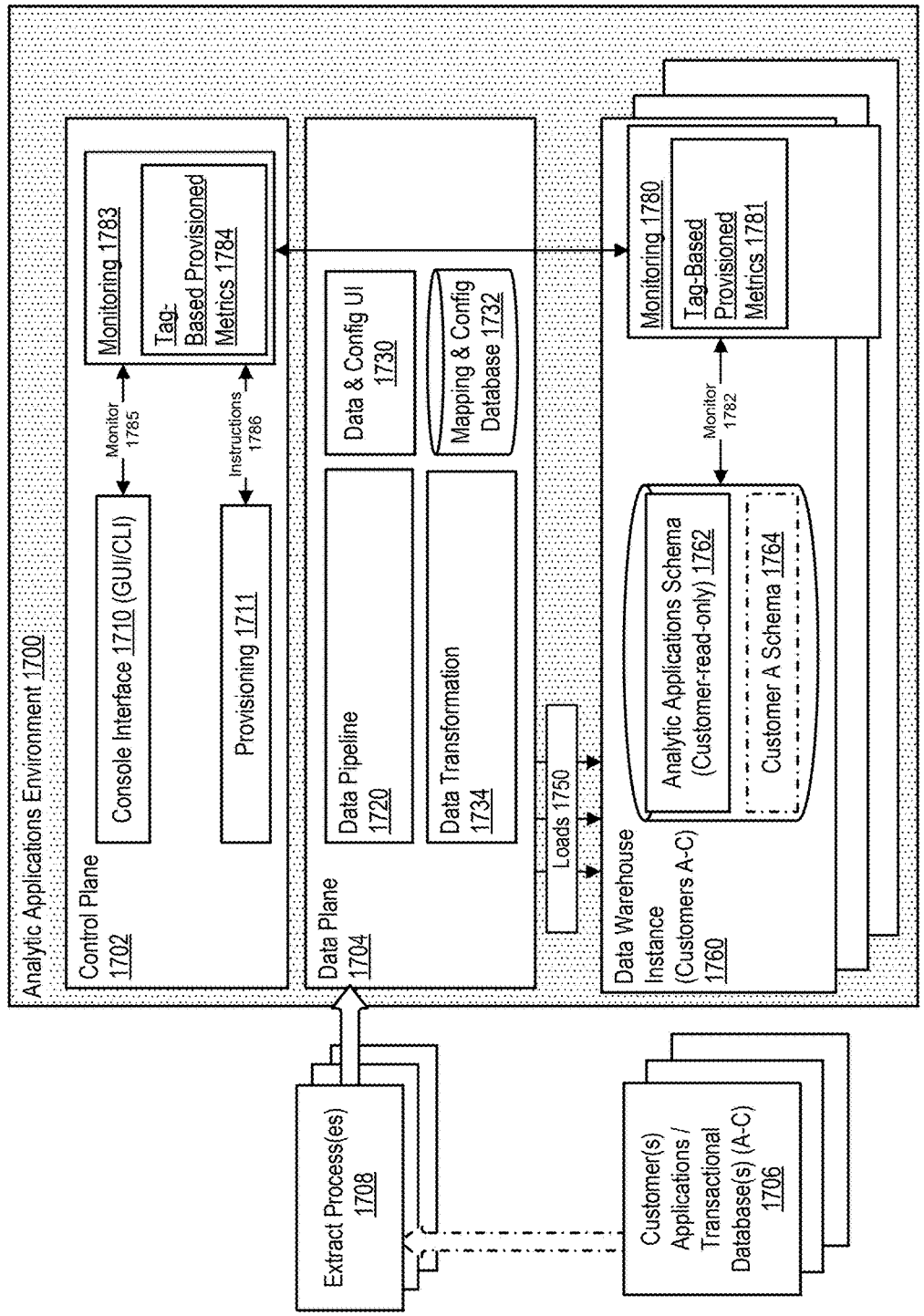
FIG. 17 illustrates a system for SaaS/PaaS resource usage and allocation in an analytic applications environment, in accordance with an embodiment.

FIG. 17 illustrates a system for SaaS/PaaS resource usage and allocation in an analytic applications environment, in accordance with an embodiment.

More specifically, FIG. 17 illustrates a system for SaaS/PaaS resource usage and allocation in an analytic applications environment supporting multiple customers/tenants.

As illustrated in FIG. 17, a control plane 1702 provides control, e.g., for cloud products offered within a SaaS environment; and can include a console interface 1710, that enables access by a client (computer) device under control of a customer/tenant; and a provisioning component 1711.

In accordance with an embodiment, for example, a customer can request a provisioning of a data warehouse instance. The provisioning component can then provision the requested data warehouse instance (including a customer schema); and populate the warehouse with the necessary information supplied by the customer. This can represent, for example, part of a PaaS component.

In accordance with an embodiment, for example, said provisioning additionally be used to, based upon, for example, a purchase order, provision a number of seats, as well number of compute units available to said provisioning customer. This can represent, for example, part of a SaaS component.

In accordance with an embodiment, each such provisioned resource, including database instances, seats, compute units . . . etc., can be tagged for each respective tenant (or sub-tenant) of the system.

As further illustrated in FIG. 17, a data plane 1704 can include a data pipeline (e.g., an extract, transform, load (ETL) process) 1720 and a data transformation layer 1734, which together operate to extract 1708 (where each extract process is separate for each tenant/customer and/or application or transactional database associated therewith), process, and load 1750, operational or transactional data from customer enterprise applications or transaction database environments, e.g., Oracle Fusion Applications environments, into data warehouse instances. The data plane can also include a data and configuration user interface 1730, and a mapping and configuration database 1732.

In accordance with an embodiment, system for SaaS/PaaS resource usage and allocation in an analytic applications environment can support multiple tenants/customers, each sharing the analytic applications environment 1700 via multiple instances of the data warehouse F60. As shown in the Figure, customers/tenants, each associated with a separate application/transactional database 1706, can be supported.

In accordance with an embodiment, the data pipeline maintains, for each customer/tenant (e.g., customers A-C associated with customer A-C applications/transactional database 1706), an analytic applications schema 1762, e.g., as a star schema, that is periodically updated (e.g., hourly/daily/weekly) by the system in accordance with best practices for a particular analytic use case, e.g., human capital management (HCM) analytics, or enterprise resource planning (ERP) analytics.

In accordance with an embodiment, the data transformation layer can include a data model (e.g., a knowledge model, KM, or other type of data model) that the system uses to transform the transactional data received from the enterprise or business application, into a model format, for loading into the data warehouse.

In accordance with an embodiment, for each customer, the system uses the analytic applications schema, that is maintained and updated by the system, to pre-populate a data warehouse instance for the customer, based on an analysis of the data within that customer's enterprise applications environment, e.g., 1706a.

In accordance with an embodiment, as such, the analytic applications schema maintained by the system enables data to be retrieved, by the data pipeline, from the customer's environment, and loaded to the customer's data warehouse instance 1760, in a "live" manner; but is otherwise made accessible to customers in a read-only manner, and is not directly modifiable by the customer.

In accordance with an embodiment, the analytic applications environment also provides, for each customer of the environment, a customer schema, such as 1764, that is readily modifiable by the customer, and which allows the customer to supplement and utilize the data within their own data warehouse instance.

In accordance with an embodiment, for each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics In accordance with an embodiment, for example, a data warehouse (e.g., an Oracle Autonomous Data Warehouse, ADWC) can include a default analytic applications schema (analytic warehouse schema) and, for each customer/tenant, a customer schema sourced from their enterprise applications component. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline can insert the extracted data into a data staging area for the tenant, which can act as a temporary staging area for the extracted data. A data quality component and data protection component can be used to ensure the integrity of the extracted data; for example, by performing validations on the extracted data while the data is temporarily held in the data staging area.

When the extract process has completed its extraction, the data transformation layer can be used to begin the transformation process, to transform the extracted data into a model format to be loaded into the customer schema of the data warehouse Using the provisioning component, a customer can request the provisioning of a customer schema 1764 within the data warehouse. The customer can also supply, via the console interface, a number of attributes associated with the data warehouse, including required attributes (e.g., login credentials), and optional attributes (e.g., size, speed, number of seats).

The provisioning component can then provision the requested data warehouse (e.g., customer schema of the data warehouse), and populate the warehouse with the necessary information supplied by the customer.

Such provisioning can be based upon, for example, a purchase order, including a number of seats, as well as a database size and a number of compute units. Such provisioned components can be tagged to each tenant of a system.

In accordance with an embodiment, one monitoring agent 1780 can be provided that supports multiple data warehouse instances 1760 (e.g., at the data warehouse, or at the control plane). The one monitoring agent 1780 can monitor multiple instances of the data warehouses by monitoring the tagged-based resources 1781, where the tags are indicative of the customer/tenant to which the resources are provisioned. In addition, one monitoring agent 1783 can be provided at the control plane, where the monitoring agent supports multiple customer/tenant instance. The one monitoring agent 1783 can monitor multiple instances of the data warehouses by monitoring the tagged-based resources 1784, where the tags are indicative of the customer/tenant to which the resources are provisioned. (In accordance with an embodiment, while shown within the Figure as two separate components, each instance of monitoring agents 1780 and 1783 can be considered to be a single entity, where the communication line between 1780 and 1783 illustrate the nature of the SaaS/PaaS relationship).

In accordance with an embodiment, the monitoring agent(s) can have access to the provisioned metrics associated with the tenant/customer to which the monitoring agents are associated (e.g., based upon the tags of the metrics which are monitored). The monitoring agent 1780 1783 can be responsible for monitoring 1782/1785 (e.g., dynamically, at set, configurable intervals, hourly, daily, etc.) the use of resources by the tenant/customer at the data warehouse (e.g., monitoring storage used by a customer/tenant at the associated data warehouse instance) and/or at the control plane (e.g., monitoring usage of compute units by a customer/tenant for use in analytics) by, for example, monitoring resources tagged by each tenant of the system. This can include, for example, monitoring and metering the customer's use of compute units in relation to the provisioned metrics, or metering the number of seats in use by a customer in relation to the provisioned metrics.

In accordance with an embodiment, the monitoring agent can use the provisioned metrics 1781/1784 (e.g., those resources provisioned or allocated to a customer/tenant in response to a provisioning by the customer/tenant) in monitoring and tracking the resource utilization by a tenant, which can provide for improved resource allocation within the systems. That is, as each tenant has the various resources provisioned to it tagged as being associated with each tenant, the monitoring agent can, via tracking the tagged (where each resourced allocated to a tenant is tagged so as to identify it as belonging to, or being allocated to, said tenant) resources, determine the resource usage for each tenant. In addition, the monitoring agent can provided a notification/instructions 1786 to the provisioning component 1711, or other back end systems, that a tenant has exceeded its provisioned resources, or that a given tenant should be provided with additional resources (e.g., compute units) for a set amount of time, given the monitored metrics associated with a tenant. Likewise, the monitoring agent 1780/1783 can provide instructions 1788 that a customer/tenant has been allocated too many resources (beyond those provisioned), which are not being utilized. In such cases, then, the provisioning component can reclaim such resources in order to, e.g., save utilization and/or provision such resources to a different tenant/customer.

Figure 18:
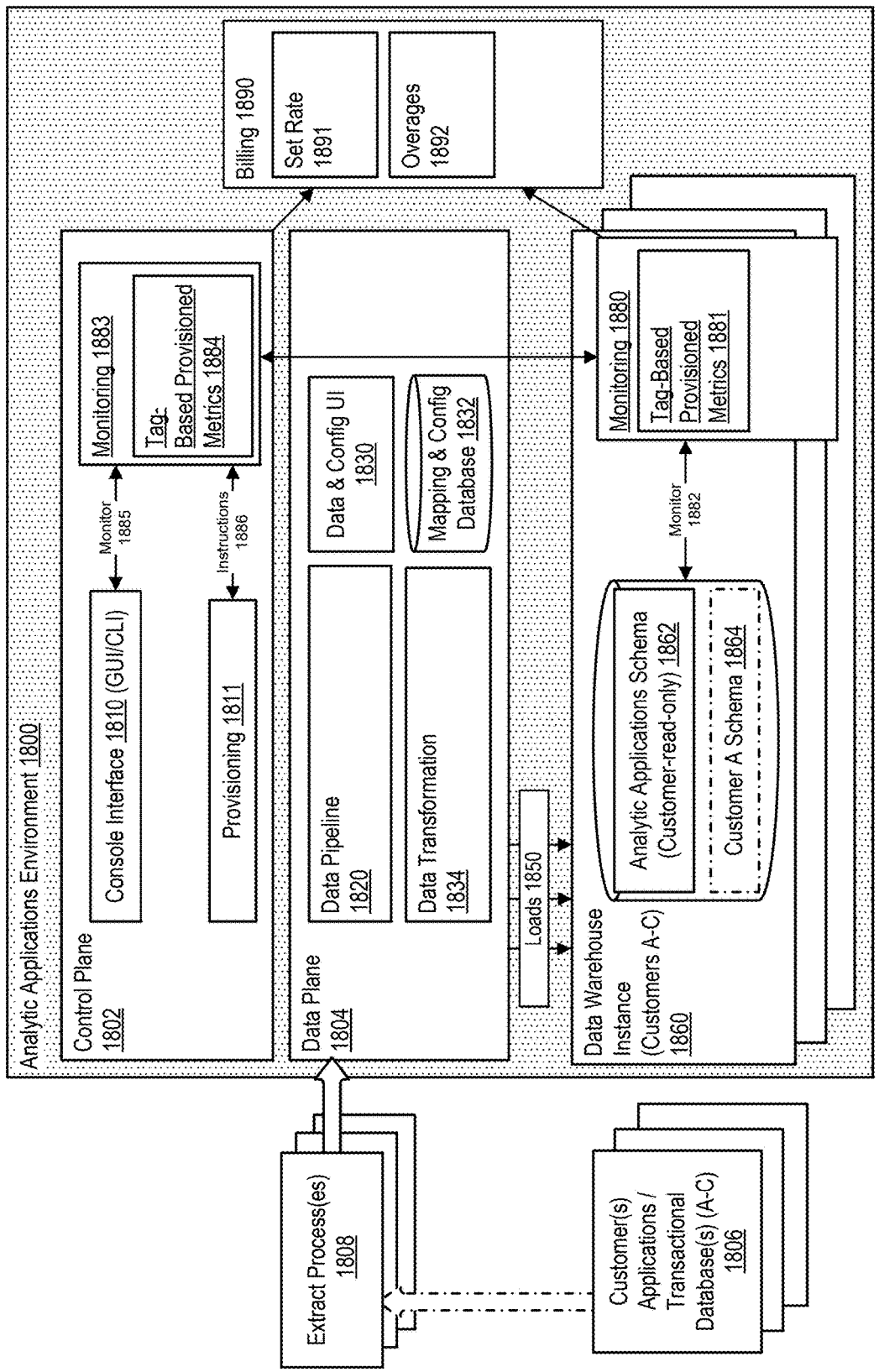
FIG. 18 illustrates a system for SaaS/PaaS resource usage and allocation in an analytic applications environment, in accordance with an embodiment.

FIG. 18 illustrates a system for SaaS/PaaS billing model in an analytic applications environment, in accordance with an embodiment.

More specifically, FIG. 18 illustrates a system for SaaS/PaaS resource usage and allocation in an analytic applications environment supporting multiple customers/tenants.

As illustrated in FIG. 18, a control plane 1802 provides control, e.g., for cloud products offered within a SaaS environment; and can include a console interface 1810, that enables access by a client (computer) device under control of a customer/tenant; and a provisioning component 1811.

In accordance with an embodiment, for example, a customer can request a provisioning of a data warehouse instance. The provisioning component can then provision the requested data warehouse instance (including a customer schema); and populate the warehouse with the necessary information supplied by the customer. This can represent, for example, part of a PaaS component.

In accordance with an embodiment, for example, said provisioning additionally be used to, based upon, for example, a purchase order, provision a number of seats, as well number of compute units available to said provisioning customer. This can represent, for example, part of a SaaS component.

In accordance with an embodiment, each such provisioned resource, including database instances, seats, compute units . . . etc., can be tagged for each respective tenant (or sub-tenant) of the system.

As further illustrated in FIG. 18, a data plane 1804 can include a data pipeline (e.g., an extract, transform, load (ETL) process) 1820 and a data transformation layer 1834, which together operate to extract 1808 (where each extract process is separate for each tenant/customer and/or application or transactional database associated therewith), process, and load 1850, operational or transactional data from customer enterprise applications or transaction database environments, e.g., Oracle Fusion Applications environments, into data warehouse instances. The data plane can also include a data and configuration user interface 1830, and a mapping and configuration database 1832.

In accordance with an embodiment, system for SaaS/PaaS resource usage and allocation in an analytic applications environment can support multiple tenants/customers, each sharing the analytic applications environment 1800 via multiple instances of the data warehouse F60. As shown in the Figure, customers/tenants, each associated with a separate application/transactional database 1806, can be supported.

In accordance with an embodiment, the data pipeline maintains, for each customer/tenant (e.g., customers A-C associated with customer A-C applications/transactional database 1806), an analytic applications schema 1862, e.g., as a star schema, that is periodically updated (e.g., hourly/daily/weekly) by the system in accordance with best practices for a particular analytic use case, e.g., human capital management (HCM) analytics, or enterprise resource planning (ERP) analytics.

In accordance with an embodiment, the data transformation layer can include a data model (e.g., a knowledge model, KM, or other type of data model) that the system uses to transform the transactional data received from the enterprise or business application, into a model format, for loading into the data warehouse.

In accordance with an embodiment, for each customer, the system uses the analytic applications schema, that is maintained and updated by the system, to pre-populate a data warehouse instance for the customer, based on an analysis of the data within that customer's enterprise applications environment, e.g., 1806a.

In accordance with an embodiment, as such, the analytic applications schema maintained by the system enables data to be retrieved, by the data pipeline, from the customer's environment, and loaded to the customer's data warehouse instance 1860, in a "live" manner; but is otherwise made accessible to customers in a read-only manner, and is not directly modifiable by the customer.

In accordance with an embodiment, the analytic applications environment also provides, for each customer of the environment, a customer schema, such as 1864, that is readily modifiable by the customer, and which allows the customer to supplement and utilize the data within their own data warehouse instance.

In accordance with an embodiment, for each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics In accordance with an embodiment, for example, a data warehouse (e.g., an Oracle Autonomous Data Warehouse, ADWC) can include a default analytic applications schema (analytic warehouse schema) and, for each customer/tenant, a customer schema sourced from their enterprise applications component. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline can insert the extracted data into a data staging area for the tenant, which can act as a temporary staging area for the extracted data. A data quality component and data protection component can be used to ensure the integrity of the extracted data; for example, by performing validations on the extracted data while the data is temporarily held in the data staging area.

When the extract process has completed its extraction, the data transformation layer can be used to begin the transformation process, to transform the extracted data into a model format to be loaded into the customer schema of the data warehouse Using the provisioning component, a customer can request the provisioning of a customer schema 1864 within the data warehouse. The customer can also supply, via the console interface, a number of attributes associated with the data warehouse, including required attributes (e.g., login credentials), and optional attributes (e.g., size, speed, number of seats). The provisioning component can then provision the requested data warehouse (e.g., customer schema of the data warehouse), and populate the warehouse with the necessary information supplied by the customer.

Such provisioning can be based upon, for example, a purchase order, including a number of seats, as well as a database size and a number of compute units. Such provisioned components can be tagged to each tenant of a system.

In accordance with an embodiment, one monitoring agent 1880 can be provided that supports multiple data warehouse instances 1860 (e.g., at the data warehouse, or at the control plane). The one monitoring agent 1880 can monitor multiple instances of the data warehouses by monitoring the tagged-based resources 1881, where the tags are indicative of the customer/tenant to which the resources are provisioned. In addition, one monitoring agent 1883 can be provided at the control plane, where the monitoring agent supports multiple customer/tenant instance. The one monitoring agent 1883 can monitor multiple instances of the data warehouses by monitoring the tagged-based resources 1884, where the tags are indicative of the customer/tenant to which the resources are provisioned. (In accordance with an embodiment, while shown within the Figure as two separate components, each instance of monitoring agents 1880 and 1883 can be considered to be a single entity, where the communication line between 1880 and 1883 illustrate the nature of the SaaS/PaaS relationship).

In accordance with an embodiment, the monitoring agent(s) can have access to the provisioned metrics associated with the tenant/customer to which the monitoring agents are associated (e.g., based upon the tags of the metrics which are monitored). The monitoring agent 1880 1883 can be responsible for monitoring 1882/1885 (e.g., dynamically, at set, configurable intervals, hourly, daily, etc.) the use of resources by the tenant/customer at the data warehouse (e.g., monitoring storage used by a customer/tenant at the associated data warehouse instance) and/or at the control plane (e.g., monitoring usage of compute units by a customer/tenant for use in analytics) by, for example, monitoring resources tagged by each tenant of the system. This can include, for example, monitoring and metering the customer's use of compute units in relation to the provisioned metrics, or metering the number of seats in use by a customer in relation to the provisioned metrics.

In accordance with an embodiment, the provisioning of the customer can be based, in part, upon a purchase order that specifies a number of seats/users that a customer wishes to have access to both the analytics environment, as well as the data warehouse 1860. Based upon the number of users/seats (in addition to other, optional attributes, such as increased/decreased database size, or increased/decreased compute units for the analytics or the data warehouse) purchased by the customer, a number of tagged, provisioned metrics 1881 and 1884 can be set in relation to the customer schema. Such an original purchase order can form part of a billing model 1890 in the form of a set rate 1891. This set rate can be thought of as the customer/tenant's original subscription.

In accordance with an embodiment, the monitoring agent 1880 and/or 1883 (in some embodiments, these can be thought of as one logical entity) can report to the billing system 1890 when, for example, a customer/tenant has additional resources provisioned. Not only can the monitoring agents provide notification to the billing 1890, but they can additionally supply information regarding the amount of additional resources provisioned to the customer/tenant in the form of overages 1892. The billing system can utilize such overages, in combination with the set rate 1891, to automatically generate a bill that combines an original subscription with one or more additionally resources provisioned based upon the monitoring.

In accordance with an embodiment, traditional SaaS (Software as a Service)/PaaS (Platform as a Service) billing systems generally charge customers/tenants for use of the SaaS/PaaS by the number of seats (e.g., users allowed to access the SaaS at any given moment) selected by the customer/tenant during the initial purchase/license agreement for the SaaS/PaaS. While this model traditionally works well for SaaS/PaaS, issues may arise when a customer/tenant requires or needs more resources above those already purchased. In such situations, for example, the only mechanism available to the customer/tenant would be to, for example, purchase a number of additional seats for the SaaS/PaaS.

In accordance with an embodiment, when a customer/tenant makes a purchase order for a SaaS/PaaS analytics data warehouse (e.g., Oracle's® Fusion Analytics Warehouse), an instance of a data warehouse (e.g., autonomous data warehouse) can be provisioned for the customer/tenant (the terms customer and tenant are used herein interchangeably). The provisioning of the autonomous data warehouse can be based upon the criteria selected by the customer/tenant at the time of purchase/license. For example, a sales order placed by a customer can specify a number of seats that the customer purchased. Based upon the number of seats, the control plane, described above, can provision a customer schema at the data warehouse. The provisioned data warehouse can specify a number of particulars about the provisioned data warehouse, including a number of compute units (e.g., Oracle® Compute Units (OCPU)) for both the analytics cloud and the autonomous data warehouse, as well as a database size. For example, if a customer purchases between 20 and 100 seats, the system could provision 4 compute units (e.g., a capacity of compute power associated with a processor, or a core of a processor) for analytics cloud, 4 compute units for autonomous data warehouse, and a 1 terabyte database.

In accordance with an embodiment, the systems and methods described herein provide a way in which a customer can scale, on demand, the provisioned compute resources associated with the customer's purchase order, without merely buying more seats. This on-demand scaling, in addition, can be billed on a pay-as-you-go model. This billing model combines a subscription-based model with a pay-as-you-go model.

Figure 19:
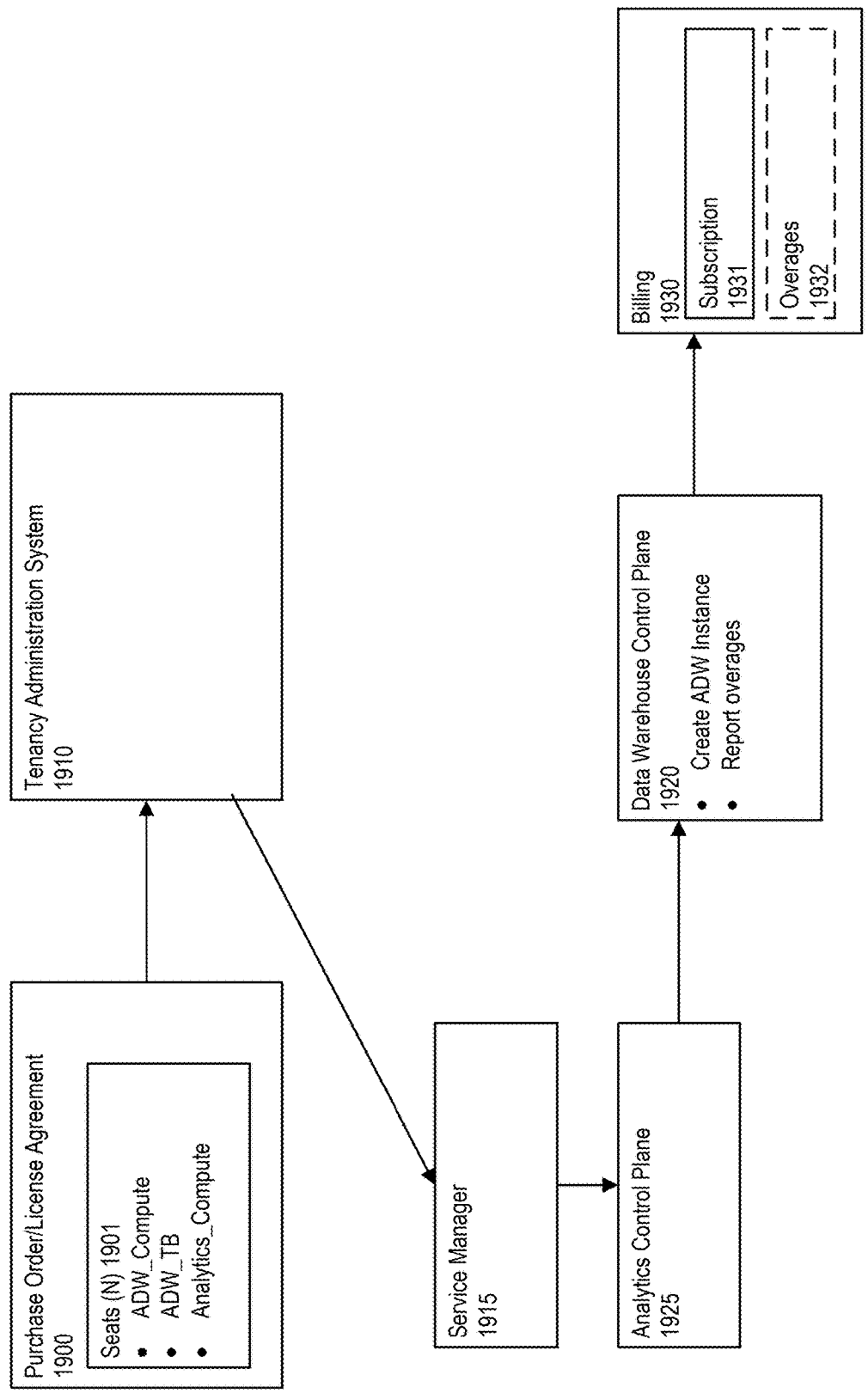
FIG. 19 illustrates a system for SaaS/PaaS resource usage and allocation in an analytic applications environment, in accordance with an embodiment.

FIG. 19 illustrates a flow chart for a SaaS/PaaS billing model in an analytic applications environment, in accordance with an embodiment.

In accordance with an embodiment, a purchase order/license agreement 1900 can be received. The purchase order can specify a number of seats 1901, which, based upon a table lookup, can indicate the type and amount of resources that are to be included in the license agreement for a customer. These resources can include, data warehouse compute units, database size, and analytics compute units.

In accordance with an embodiment, this information, along with customer specific information, can be passed to tenancy administration system (TAS) 1910, which can comprise a provisioning system, as described above. The TAS can communicate with a service manager 1915, which can process analytics entitlements (e.g., based upon the number of seats as well as the number of analytics compute resources specified). This can then be passed to an analytics control plane, which can provision an analytics environment (e.g., based upon the number of seats as well as the number of analytics compute resources specified). As part of this provisioning, information can be passed to a data warehouse control plane 1920, along with the minimum provisioned metrics (database size, data warehouse compute units). The data warehouse control plane can then create the ADW instance.

In accordance with an embodiment, as described above, the data warehouse is responsible for metering usage and reporting overages to a billing system 1930, which can then generate bills based upon a subscription rate 1931, as well as overages 1932 reported by the data warehouse.

Figure 20:
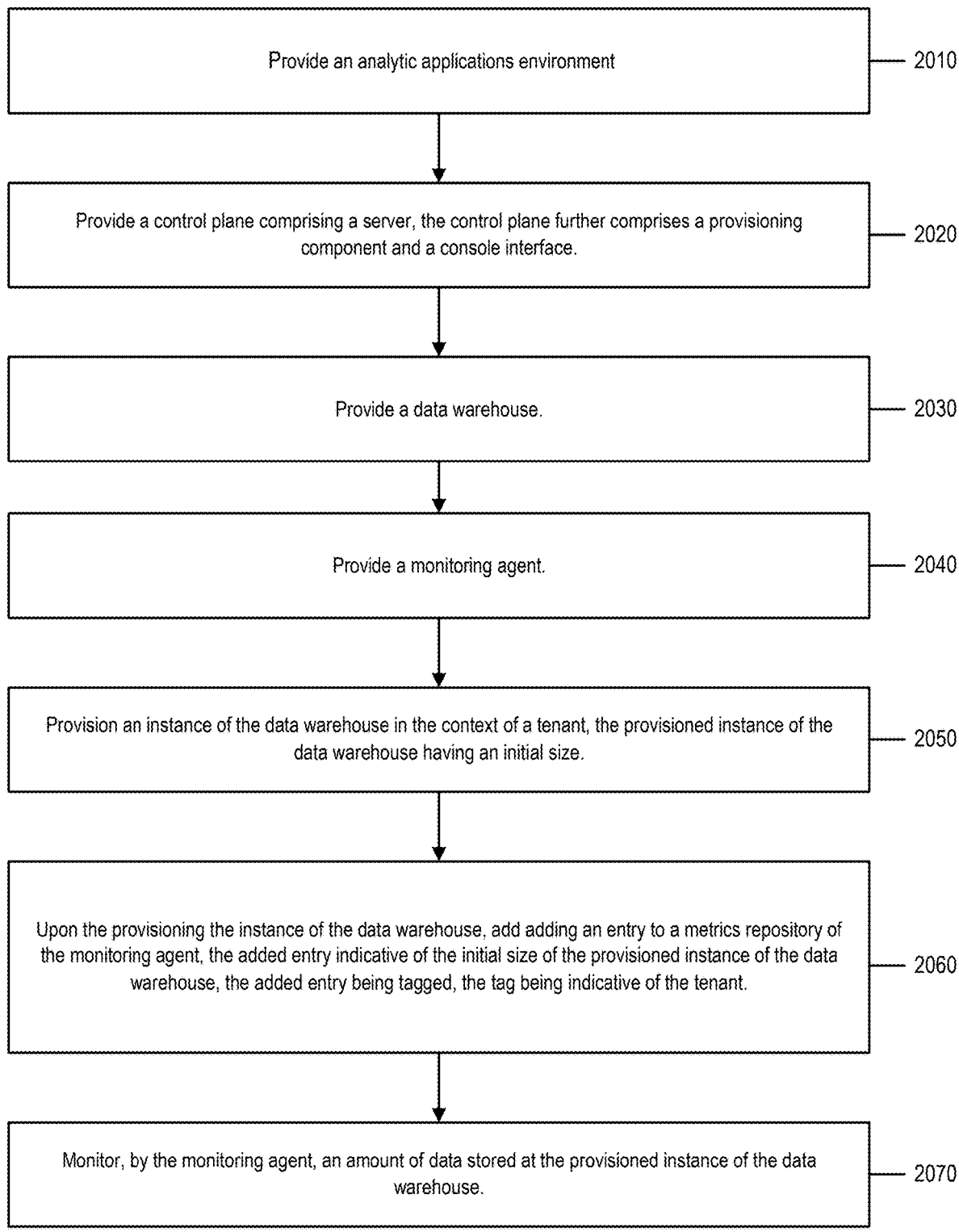
FIG. 20 is a flowchart for a method for SaaS/PaaS resource usage and allocation in an analytic applications environment, in accordance with an embodiment.

FIG. 20 is a flowchart for a method for SaaS/PaaS resource usage and allocation in an analytic applications environment, in accordance with an embodiment.

In accordance with an embodiment, at step 2010, the method can provide an analytic applications environment.

In accordance with an embodiment, at step 2020, the method can provide a control plane comprising a server, the control plane further comprises a provisioning component and a console interface.

In accordance with an embodiment, at step 2030, the method can provide a data warehouse.

In accordance with an embodiment, at step 2040, the method can provide a monitoring agent.

In accordance with an embodiment, at step 2050, the method can provision an instance of the data warehouse in the context of a tenant, the provisioned instance of the data warehouse having an initial size.

In accordance with an embodiment, at step 2060, upon the provisioning the instance of the data warehouse, the method can add adding an entry to a metrics repository of the monitoring agent, the added entry indicative of the initial size of the provisioned instance of the data warehouse, the added entry being tagged, the tag being indicative of the tenant.

In accordance with an embodiment, at step 2070, the method can monitor, by the monitoring agent, an amount of data stored at the provisioned instance of the data warehouse.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although several of the examples provided herein illustrate operation of an analytic applications environment with an enterprise software application or data environment such as, for example, an Oracle Fusion Applications environment; or within the context of a software-as-a-service (SaaS) or cloud environment such as, for example, an Oracle Analytics Cloud or Oracle Cloud Infrastructure environment; in accordance with various embodiments, the systems and methods described herein can be used with other types of enterprise software application or data environments, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for resource allocation and utilization management in an analytics cloud environment, comprising:
    a computer including one or more processors, that provides access to a data analytics environment and a data warehouse for storage of data by a plurality of tenants;
    a provisioning component for use in provisioning an instance of the data analytics environment and data warehouse in a context of a tenant, the provisioned instance having an initial allocation of compute resources including data size; and
    a monitoring agent that monitors use of the data analytics environment and data warehouse by each tenant instance, and updates a metrics repository with entries indicative of the use by the provisioned instance of compute resources including data size, the entries being tagged, and indicative of the tenant;
    wherein the monitoring agent monitors an amount of compute resources including data usage at the provisioned instance of the data warehouse, and provides notifications in response thereto, said notifications including an indication of an amount of change in the size of the provisioned instance of the data warehouse.

2. The system of claim 1,
    wherein the monitoring agent detects an amount of data stored at the provisioned instance of the data warehouse is equal to an initial size of the provisioned instance of the data warehouse.

3. The system of claim 2,
    wherein upon the monitoring agent detecting the amount of data stored at the provisioned instance of the data warehouse is equal to the initial size of the provisioned instance of the data warehouse, the monitoring agent provides instructions to the provisioning component, the instructions causing the provisioning component to increase the initial size of the provisioned instance of the data warehouse.

4. The system of claim 3,
    wherein upon the provisioning component increasing the initial size of the provisioned instance of the data warehouse, the monitoring component sends the notification to a billing component to generate an updated invoice.

5. The system of claim 4,
    wherein the billing component creates the updated invoice in response to receiving the notification from the monitoring component, the updated invoice reflecting the increase in initial size of the provisioned instance of the data warehouse, the updated invoice automatically generated based on a set rate and combining an original subscription with one or more additional resources provisioned based on the monitoring.

6. The system of claim 1,
    wherein a discrete number of compute units are provisioned in the context of the tenant;
    wherein the monitoring agent detects usage by the tenant of a number of compute units greater that the discrete number of compute units provisioned in the context of the tenant.

7. The system of claim 6,
    wherein upon the monitoring agent detecting the usage by the tenant of a number of compute units greater that the discrete number of compute units provisioned in the context of the tenant, the monitoring agent provides instructions to the provisioning component, the instructions causing the provisioning component to provision a further number of discrete compute units for use by the tenant.

8. A method for resource allocation and utilization management in an analytics cloud environment, comprising:
    providing a computer including one or more processors, that provides access to a data analytics environment and a data warehouse for storage of data by a plurality of tenants;
    providing a provisioning component for use in provisioning an instance of the data analytics environment and data warehouse in a context of a tenant, the provisioned instance having an initial allocation of compute resources including data size; and
    providing a monitoring agent that monitors use of the data analytics environment and data warehouse by each tenant instance, and updates a metrics repository with entries indicative of the use by the provisioned instance of compute resources including data size, the entries being tagged, and indicative of the tenant;
    wherein the monitoring agent monitors an amount of compute resources including data usage at the provisioned instance of the data warehouse, and provides notifications in response thereto, said notifications including an indication of an amount of change in the size of the provisioned instance of the data warehouse.

9. The method of claim 8, further comprising:
    detecting, by the monitoring agent, an amount of data stored at the provisioned instance of the data warehouse is equal to an initial size of the provisioned instance of the data warehouse.

10. The method of claim 9, further comprising:
    upon the monitoring agent detecting the amount of data stored at the provisioned instance of the data warehouse is equal to the initial size of the provisioned instance of the data warehouse, providing, by the monitoring agent, instructions to the provisioning component the instructions causing the provisioning component to increase the initial size of the provisioned instance of the data warehouse.

11. The method of claim 10, further comprising:
    upon the provisioning component increasing the initial size of the provisioned instance of the data warehouse, sending, by the monitoring agent, the notification to a billing component.

12. The method of claim 11, further comprising
creating, by the billing component, an invoice in response to receiving the notification from the monitoring component, the invoice reflecting the increase in initial size of the provisioned instance of the data warehouse.

13. The method of claim 8,
wherein a discrete number of compute units are provisioned in the context of the tenant;
wherein the monitoring agent detects usage by the tenant of a number of compute units greater that the discrete number of compute units provisioned in the context of the tenant.

14. The method of claim 13,
wherein upon the monitoring agent detecting the usage by the tenant of a number of compute units greater that the discrete number of compute units provisioned in the context of the tenant, the monitoring agent provides instructions to the provisioning component, the instructions causing the provisioning component to provision a further number of discrete compute units for use by the tenant.

15. A non-transitory computer readable storage medium having instructions thereon, which when read and executed cause a computer to perform steps comprising:
providing a computer including one or more processors, that provides access to a data analytics environment and a data warehouse for storage of data by a plurality of tenants;
providing a provisioning component for use in provisioning an instance of the data analytics environment and data warehouse in a context of a tenant, the provisioned instance having an initial allocation of compute resources including data size; and
providing a monitoring agent that monitors use of the data analytics environment and data warehouse by each tenant instance, and updates a metrics repository with entries indicative of the use by the provisioned instance of compute resources including data size, the entries being tagged, and indicative of the tenant;
wherein the monitoring agent monitors an amount of compute resources including data usage at the provisioned instance of the data warehouse, and provides notifications in response thereto, said notifications including an indication of an amount of change in the size of the provisioned instance of the data warehouse.

16. The non-transitory computer readable storage medium of claim 15, the steps further comprising:
detecting, by the monitoring agent, an amount of data stored at the provisioned instance of the data warehouse is equal to an initial size of the provisioned instance of the data warehouse.

17. The non-transitory computer readable storage medium of claim 16, the steps further comprising:
upon the monitoring agent detecting the amount of data stored at the provisioned instance of the data warehouse is equal to the initial size of the provisioned instance of the data warehouse, providing, by the monitoring agent, instructions to the provisioning component, the instructions causing the provisioning component to increase the initial size of the provisioned instance of the data warehouse.

18. The non-transitory computer readable storage medium of claim 17, the steps further comprising:
upon the provisioning component increasing the initial size of the provisioned instance of the data warehouse, sending, by the monitoring agent, the notification to a billing component.

19. The non-transitory computer readable storage medium of claim 18, the steps further comprising
creating, by the billing component, an invoice in response to receiving the notification from the monitoring component, the invoice reflecting the increase in initial size of the provisioned instance of the data warehouse.

20. The non-transitory computer readable storage medium of claim 15,
wherein a discrete number of compute units are provisioned in the context of the tenant;
wherein the monitoring agent detects usage by the tenant of a number of compute units greater that the discrete number of compute units provisioned in the context of the tenant; and
wherein upon the monitoring agent detecting the usage by the tenant of a number of compute units greater that the discrete number of compute units provisioned in the context of the tenant, the monitoring agent provides instructions to the provisioning component, the instructions causing the provisioning component to provision a further number of discrete compute units for use by the tenant.

* * * * *

UNITED STATES PATENT AND TRADEMARK OFFICE
CERTIFICATE OF CORRECTION

Page 1 of 2

PATENT NO. : 12,265,549 B2
APPLICATION NO. : 17/883471
DATED : April 1, 2025
INVENTOR(S) : Chawla et al.

It is certified that error appears in the above-identified patent and that said Letters Patent is hereby corrected as shown below:

In the Specification

In Column 4, Line 62, delete "(ADVV)," and insert -- (ADW), --, therefor.

In Column 5, Line 21, delete "(ADVV)," and insert -- (ADW), --, therefor.

In Column 5, Line 34, delete "organization," and insert -- organization. --, therefor.

In Column 9, Line 29, delete "incudes" and insert -- includes --, therefor.

In Column 11, Line 12, delete "analytics" and insert -- analytics. --, therefor.

In Column 13, Line 57, delete "/ETU/" and insert -- /ETL// --, therefor.

In Column 16, Line 43, delete "analytics" and insert -- analytics. --, therefor.

In Column 17, Line 8, delete "warehouse" and insert -- warehouse. --, therefor.

In Column 19, Line 38, delete "analytics" and insert -- analytics. --, therefor.

In Column 20, Line 3, delete "warehouse" and insert -- warehouse. --, therefor.

In Column 22, Line 38, delete "analytics" and insert -- analytics. --, therefor.

In Column 23, Line 3, delete "warehouse" and insert -- warehouse. --, therefor.

In Column 25, Line 40, delete "analytics" and insert -- analytics. --, therefor.

In Column 26, Line 5, delete "warehouse" and insert -- warehouse. --, therefor.

Signed and Sealed this
Seventeenth Day of June, 2025

Coke Morgan Stewart
*Acting Director of the United States Patent and Trademark Office*

CERTIFICATE OF CORRECTION (continued)
U.S. Pat. No. 12,265,549 B2

In Column 28, Line 40, delete "analytics" and insert -- analytics. --, therefor.

In Column 29, Line 5, delete "warehouse" and insert -- warehouse. --, therefor.

In Column 31, Line 43, delete "analytics" and insert -- analytics. --, therefor.

In Column 32, Line 8, delete "warehouse" and insert -- warehouse. --, therefor.

In Column 34, Line 32, delete "analytics" and insert -- analytics. --, therefor.

In Column 34, Line 64, delete "warehouse" and insert -- warehouse. --, therefor.

In Column 37, Line 30, delete "analytics" and insert -- analytics. --, therefor.

In Column 37, Line 62, delete "warehouse" and insert -- warehouse. --, therefor.